United States Patent
Koba et al.

(10) Patent No.: US 7,334,023 B2
(45) Date of Patent: Feb. 19, 2008

(54) DATA TRANSFER SCHEME FOR REDUCING NETWORK LOAD USING GENERAL PURPOSE BROWSER ON CLIENT SIDE

(75) Inventors: Yuichi Koba, Kanagawa (JP); Yasuhiro Kimura, Kanagawa (JP); Kenichiro Yoshii, Tokyo (JP); Atsushi Shono, Kanagawa (JP); Hideaki Sato, Kanagawa (JP); Toshibumi Seki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 800 days.

(21) Appl. No.: 10/396,521

(22) Filed: Mar. 26, 2003

(65) Prior Publication Data

US 2003/0187960 A1 Oct. 2, 2003

(30) Foreign Application Priority Data

Mar. 26, 2002 (JP) ............................. 2002-084926

(51) Int. Cl.
*G06F 15/167* (2006.01)
*G06F 15/16* (2006.01)

(52) U.S. Cl. ..................... 709/213; 709/232; 709/203
(58) Field of Classification Search ................ 709/203, 709/219, 213, 232
See application file for complete search history.

(56) References Cited

U.S. PATENT DOCUMENTS

| | | | | |
|---|---|---|---|---|
| 5,838,790 A | * | 11/1998 | McAuliffe et al. .......... 713/176 |
| 5,864,852 A | * | 1/1999 | Luotonen ...................... 726/14 |
| 6,061,697 A | * | 5/2000 | Nakao ......................... 715/513 |
| 6,119,153 A | * | 9/2000 | Dujari et al. ................ 709/218 |
| 6,138,162 A | * | 10/2000 | Pistriotto et al. ........... 709/229 |
| 6,467,026 B2 | * | 10/2002 | Yamamoto et al. ......... 711/118 |
| 6,564,257 B1 | * | 5/2003 | Emens et al. ................ 709/219 |
| 6,654,741 B1 | * | 11/2003 | Cohen et al. ................... 707/6 |
| 6,757,726 B2 | * | 6/2004 | Matsumoto et al. ........ 709/223 |
| 6,766,422 B2 | * | 7/2004 | Beyda ......................... 711/137 |
| 6,804,683 B1 | * | 10/2004 | Matsuzaki et al. ....... 707/104.1 |
| 6,813,690 B1 | * | 11/2004 | Lango et al. ................ 711/118 |
| 6,826,626 B1 | * | 11/2004 | McManus ................... 709/246 |
| 6,910,073 B2 | * | 6/2005 | Banga et al. ............... 709/225 |
| 6,934,761 B1 | * | 8/2005 | Curtis ......................... 709/237 |

(Continued)

FOREIGN PATENT DOCUMENTS

JP 2986097 10/1999

(Continued)

OTHER PUBLICATIONS

U.S. Appl. No. 10/094,462, filed Mar. 11, 2002, Kanai et al.

(Continued)

*Primary Examiner*—William Vaughn
*Assistant Examiner*—Kristie D. Shingles
(74) *Attorney, Agent, or Firm*—Oblon, Spivak, McClelland, Maier & Neustadt, P.C.

(57) ABSTRACT

In a client server system, the network load is reduced by using the fingerprint compression and the differential compression, by providing the proxy server at the server side and using the general purpose browser at the client side, without requiring a separate proxy server at the client side. The client downloads and installs a fingerprint cache processing engine as a plug-in.

11 Claims, 22 Drawing Sheets

U.S. PATENT DOCUMENTS

| | | | | |
|---|---|---|---|---|
| 6,952,730 | B1* | 10/2005 | Najork et al. | 709/225 |
| 6,968,396 | B1* | 11/2005 | Schillings et al. | 709/246 |
| 6,985,936 | B2* | 1/2006 | Agarwalla et al. | 709/221 |
| 7,035,911 | B2* | 4/2006 | Lowery et al. | 709/217 |
| 7,054,912 | B2* | 5/2006 | Kanai et al. | 709/213 |
| 7,058,700 | B1* | 6/2006 | Casalaina | 709/220 |
| 7,080,207 | B2* | 7/2006 | Bergsten | 711/135 |
| 7,082,454 | B1* | 7/2006 | Gheith | 709/203 |
| 7,139,747 | B1* | 11/2006 | Najork | 707/3 |
| 7,171,469 | B2* | 1/2007 | Ackaouy et al. | 709/225 |
| 7,203,906 | B2* | 4/2007 | Abbott et al. | 715/747 |
| 2003/0028796 | A1* | 2/2003 | Roberts et al. | 713/193 |

FOREIGN PATENT DOCUMENTS

| | | |
|---|---|---|
| JP | 3102369 | 8/2000 |
| JP | 3167484 | 3/2001 |
| JP | 2001-142768 | 5/2001 |
| JP | 2001-184344 | 7/2001 |

OTHER PUBLICATIONS

U.S. Appl. No. 10/092,540, filed Mar. 8, 2002, Kanai et al.
U.S. Appl. No. 10/167,413, filed Jun. 13, 2002, Seki et al.
U.S. Appl. No. 10/253,517, filed Sep. 25, 2002, Kanai et al.
U.S. Appl. No. 10/396,396, filed Mar. 26, 2003, Kimura et al.
U.S. Appl. No. 10/396,521, filed Mar. 26, 2003, Koba et al.
Kenichiro Yoshi, et al., "Fingerprint Cache and Application to Dynamic Web Contents Delivery," The Fourth Internet Technology Workshop, Japan Society for Software Science and Technology, Sep. 6, 2001WIT2001-G3-1, pp. 1-8.

* cited by examiner

FIG.11

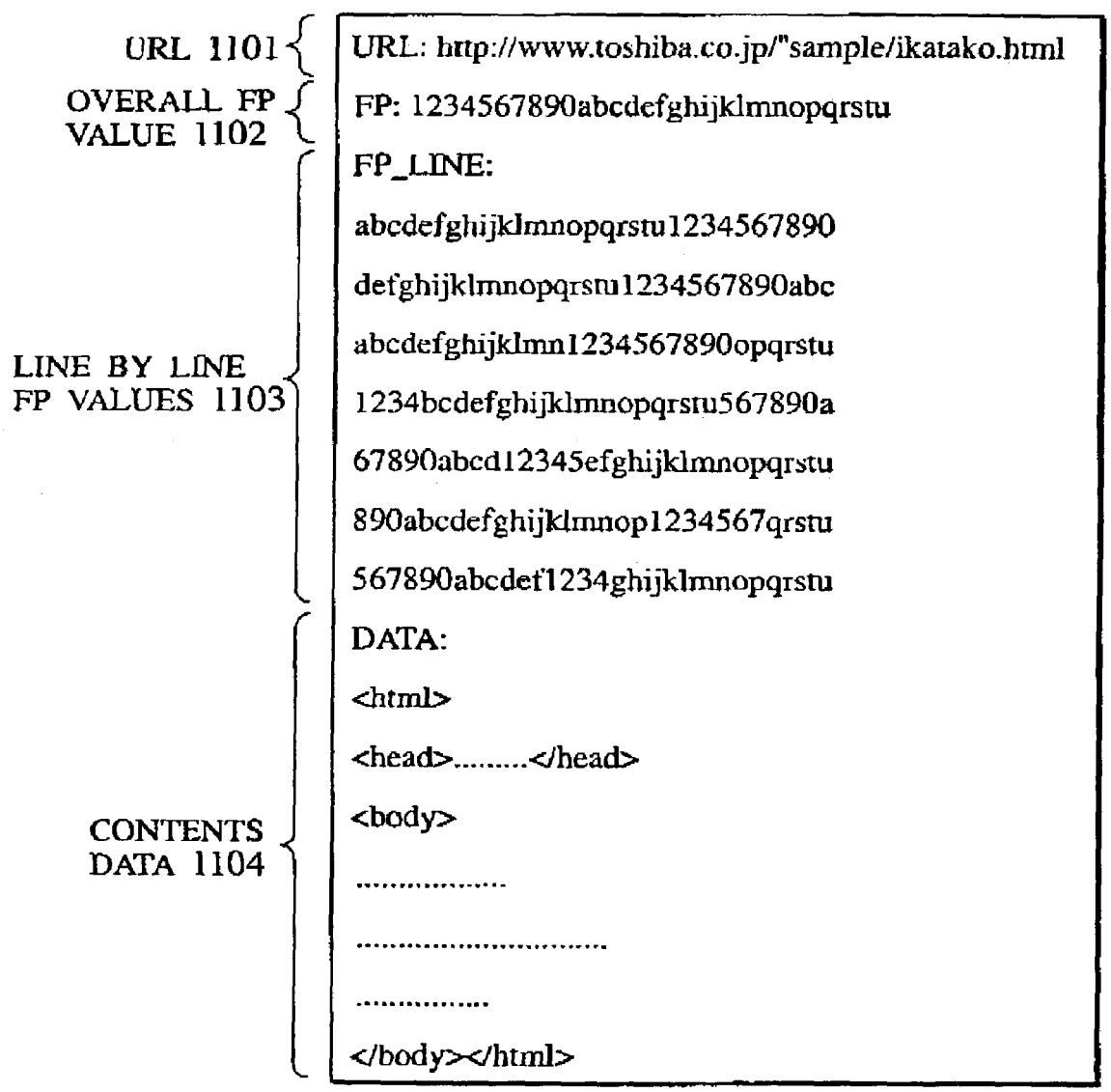

- URL 1101: URL: http://www.toshiba.co.jp/~sample/ikatako.html
- OVERALL FP VALUE 1102: FP: 1234567890abcdefghijklmnopqrstu
- LINE BY LINE FP VALUES 1103:
  FP_LINE:
  abcdefghijklmnopqrstu1234567890
  defghijklmnopqrstu1234567890abc
  abcdefghijklmn1234567890opqrstu
  1234bcdefghijklmnopqrstu567890a
  67890abcd12345efghijklmnopqrstu
  890abcdefghijklmnop1234567qrstu
  567890abcdef1234ghijklmnopqrstu
- CONTENTS DATA 1104:
  DATA:
  <html>
  <head>..........</head>
  <body>
  ..................
  ............................
  ...............
  </body></html>

FIG.13

```
HTTP/1.1 200 OK
Date: Tue, 26 Feb 2002 11:39:39 GMT
Content-Type: text/html
Last-Modified: Mon, 25 2002 12:34:56 GMT
Content-Length: 5963
```

FIG.15

```
<!--
fingerprint: 0123456789Oabcdefghijklmnopqrstu          ← FP VALUE 1011

Mode: Differential                                  ┐
<Include L1-L5@01defghijmno23kl4567890abcpqrstu>    │

TOMMOROW'S SCHEDULE<br>                             │
WAKE UP AT 6:00<br>                                 │
BREAKFAST AT 6:15<br>                               │  DIFFERENCE
DEPARTURE AT 7:00<br>                               │  DATA 1012
ARRIVAL AT 8:10<br>                                 │

<include L8-L15@ghij01defm67890abcpqno23kl45rstu>   │

TOMMOROW'S WEATHER<br>                              │

RAIN<br>                                            │
HIGHEST TEMPERATURE IS 15℃(ACCORDING TO             │
WEATHER INFORMATION AS OF 18:00)<br>                │

<include L25-L30@efm 67ghtuij01d8bcp90aqno23kl4e5r> ┘
-->
```

DIFFERENCE BASE FP VALUE 1013 → (points to first include line)
DIFFERENCE BASE FP VALUE 1014 → (points to second include line)
DIFFERENCE BASE FP VALUE 1015 → (points to third include line)

FIG.16

`<include L1-L5@01defghijmno23kl4567890abcpqrstu>`

IDENTIFIER 1021
(IDENTIFIER INDICATING
THAT IT IS INSERTED LINE)

REFERRED LINE
INDICATOR 1022

INDICATING WHICH LINES OF DIFFERENCE
BASE DATA ARE TO BE REFERRED
(FROM 1ST LINE TO 5TH LINE, AS
IT IS "L1-L5" IN THIS EXAMPLE)

FP VALUE OF DIFFERENCE
BASE DATA 1023

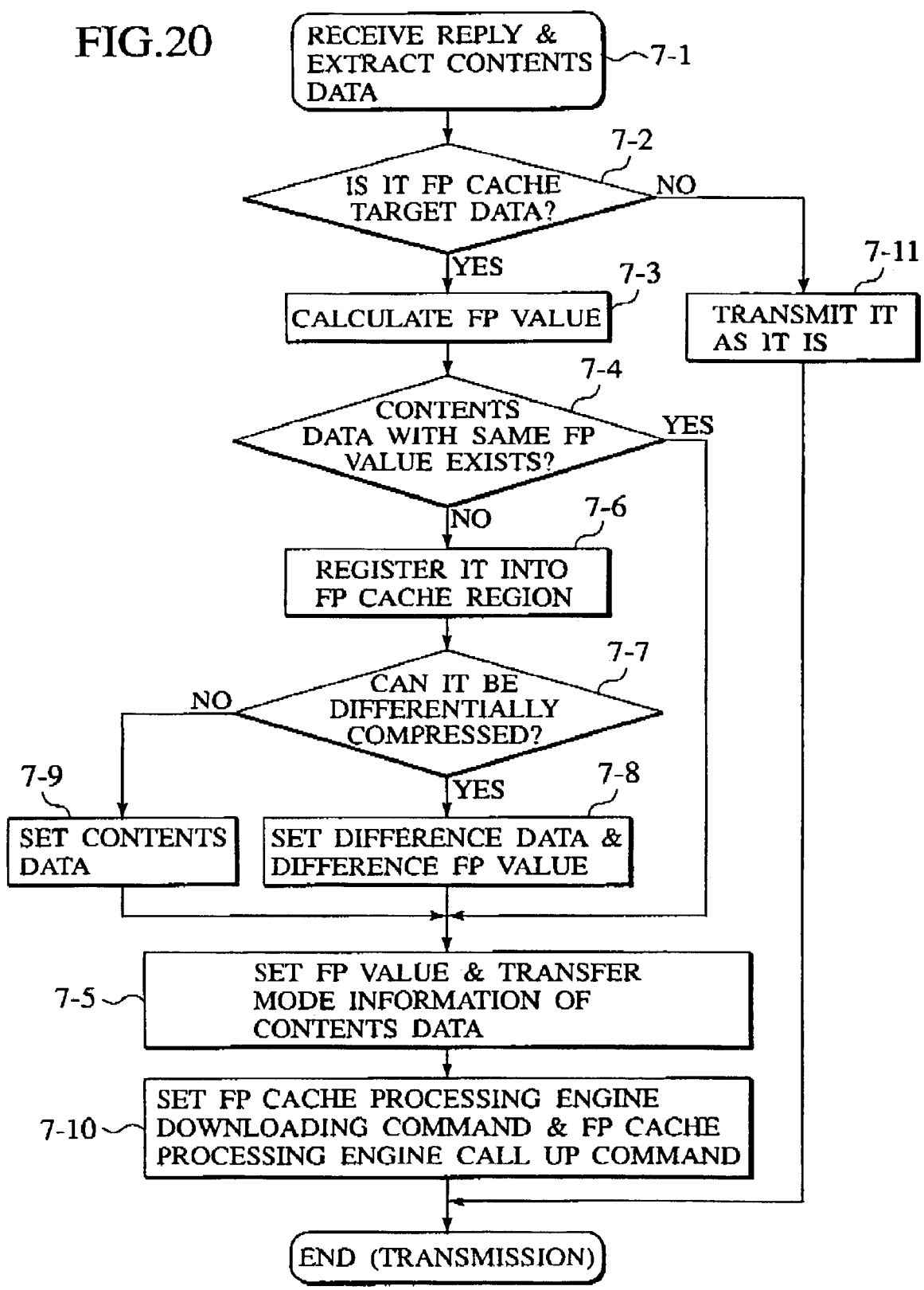

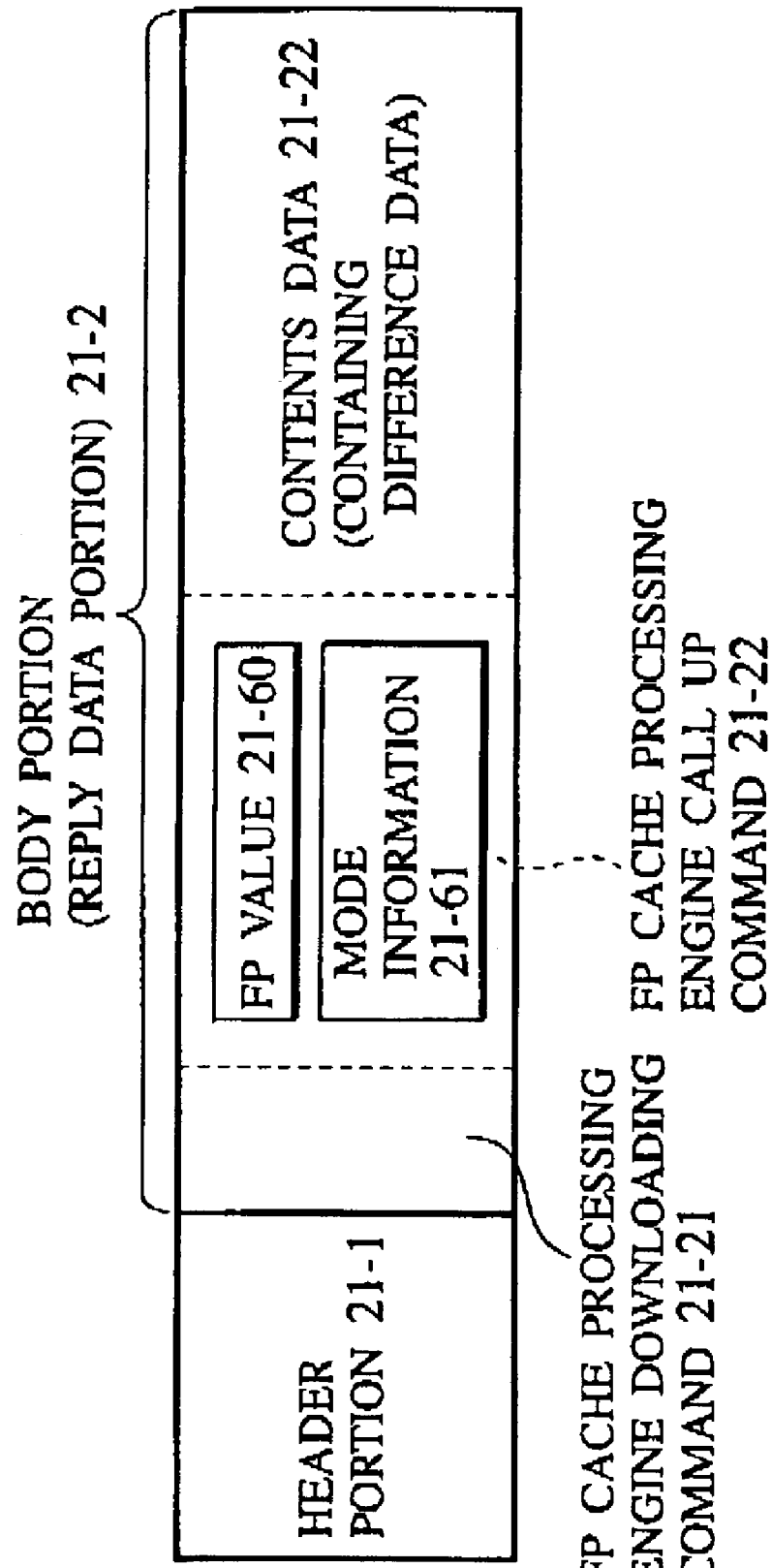

FIG.22

```
<HTML><HEAD>
<OBJECT ID="mobileCSP" CLASSID="CLSID:12345678-ABCD-1234-5678-000001234567"
CODEBASE="http://www.toshiba.co.jp/mobile_script.ocx#version=1.0.0.0">
</OBJECT>

<COMMENT ID="DMOVE">
<HTML><BODY>
<H1>Welcome</H1>
</BODY></HTML>
</COMMENT>
</HEAD>
<script language="JScript">
<!--
var mcsp=new ActiveXObject ("mobile.script.mobileCSP") ;
var fp="0123456789abcdefghijklmnopqrstu" ;
var contents=document.all.DMOVE.innerHTML ;
var output=mcsp.regFP (contents.fp) ;
document.open ("text/html") ;
document.write (output) ;
document.close () ;
//-->
</script>
<noscript>
THIS NETWORK CANNNOT OPERATE NORMALLY UNLESS JavaScript IS
OPERATED. PLEASE TURN ON JavaScript FUNCTION.
</noscript>
</html>
```

21-21

21-23

COMMAND 22-1
COMMAND 22-2
COMMAND 22-3
COMMAND 22-4
COMMAND 22-5

21-22

DATA TRANSFER SCHEME FOR REDUCING NETWORK LOAD USING GENERAL PURPOSE BROWSER ON CLIENT SIDE

BACKGROUND OF THE INVENTION

1. Field of the Invention

The present invention relates to data transfer device and method.

2. Description of the Related Art

The client-server type information system having a server for providing various services on a network and a client for requesting services to the server is widely used. The World Wide Wed system (referred hereafter as Web) for carrying out communications by utilizing the HTTP (HyperText Transfer Protocol) on the internet is the very widely used client-server type information system. Normally, in the Web, a server program is operated on the server and a prescribed program such as a Web browser is operated on the client.

In the client-server type information system such as Web, the services are provided by the communications between the client and the server. Consequently, the communication bandwidth between the client and the server tends to become a bottleneck of the entire system. For this reason, the cache technique is usually used for the purpose of reducing the network load.

In the case of the Web, the Web browser or the like that is operated on the client often utilizes the cache function, to cache recently accessed data. In the Web system, the access is made by specifying the information or the service by a URL (Uniform Resource Locator), so that the cache on the client stores those which are cachable among data returned as results of requesting the information or the service to the Web server in the past, in the cache in correspondence to their URLs. Then, when there is a request for the information or the service of the same URL as that present in the cache, that data is returned such that the communication with the server can be eliminated, as long as it is possible to judge that the data in the cache is not obsolete yet.

Also, in the case of using LAN (Local Area Network), the cache function is often provided at a proxy server that is provided between the LAN and the Internet. The cache of the client described above is a cache dedicated to the user of that client, but the cache of the proxy server on the LAN is operated as a cache snared by a plurality of users, so that the cache works even in the case of accessing the URL that was accessed by the other client in the past.

The caching targets of these caches are static contents. In the past, many of the information and the services disclosed on the Web are largely static contents for which the information updating frequency is not very high and which are disclosed to the unspecified many, so that the checking of the presence/absence of the cache on the basis of URL was sufficiently effective.

However, as the system in which the user uses the Web browser to access the information and the service on the server via the network such as the Web based ASP (Application Service Provider) becomes widespread, the data that cannot be handled by the above described cache technique are increasing.

In order to deal with such problems, the cache technique using a fingerprint (FP) compression has been proposed in the commonly assigned, co-pending U.S. patent application Ser. No. 10/092,540.

In the U.S. patent application Ser. No. 10/092,540, the FP compression processing is carried out between a proxy server on the client side (CSP: Client Side Proxy) and a proxy server on the Web server side (SSP: Server Side Proxy), so that two proxy servers are necessary and there has been a problem that the network configuration becomes complicated.

For example, in the case of the portable terminal utilizing the Mobile IP technique, the communication path from the portable terminal to the Web server and the communication path from the Web server to the portable terminal are different so that it is difficult to use the CSP.

BRIEF SUMMARY OF THE INVENTION

It is therefore an object of the present invention to provide a data transfer scheme capable of reducing the network load, by using a general purpose browser on the client side, without requiring a separate CSP between the SSP and the client.

According to one aspect of the present invention there is provided a data transfer device for transferring a request received from a client to a server which is a destination of the request, and transferring contents data according to the request received from the server to the client that is a source of the request, comprising: a reception unit configured to receive the request from the client and the contents data from the server; a transmission unit configured to transmit the request to the server and the contents data to the client; a feature so quantity calculation unit configured to calculate a feature quantity indicating a feature of the contents data, upon receiving the contents data in response to the request; a memory unit configured to store the feature quantity and the contents data in correspondence; a search unit configured to search through the memory unit to check whether the feature quantity identical to a new feature quantity calculated by the feature quantity calculation unit is stored in the memory unit or not, and output a search result; and a control unit configured to control the search unit to carry out a search, determine information to be transmitted from the transmission unit according to the search result, and control the transmission unit to transmit to the client a reply message formed by a header portion and a body portion, which contains the feature quantity in the body portion, when the feature quantity identical to the new feature quantity is stored in tile memory unit, or control the transmission unit to transmit to the client the reply message which contains the contents data and the new feature quantity in the body portion, while storing the new feature quantity and a corresponding contents data in the memory unit, when the feature quantity identical to the new feature quantity is not stored in the memory unit.

According to another aspect of the present invention there is provided a data receiving and displaying device, comprising: a transmission unit configured to transmit a request to a data transfer device; a reception unit configured to receive a reply message formed by a header portion and a body portion, according to the request from the data transfer device; an analysis unit configured to analyze the reply message and carry out processing according to a message format; a display unit configured to display processed data; a memory unit configured to store a contents data and a feature quantity in correspondence, when the reply message contains the contents data and the feature quantity in the body portion as a result of analysis by the analysis unit; a search unit configured to search through the memory unit to check whether the feature quantity identical to the feature quantity contained in the reply message is stored in the memory unit or not and output a search result, when the reply message contains the feature quantity but no contents data in the body portion as a result of analysis by the analysis unit, and acquire the contents data corresponding to the feature quantity from the memory unit and output the contents data to the analysis unit, when the feature quantity identical to the feature quantity contained in the reply message is stored in the memory unit as a result of search by the search unit; and a contents data composition unit configured to acquire the contents data having the feature quantity identical to the feature quantity contained in the reply message by transmitting the request from the transmission unit to the data transfer device, and output the contents data to the analysis unit, when the feature quantity identical to the feature quantity contained in the reply message is not stored in the memory unit as a result of search by the search unit.

According to another aspect of the present invention there is provided a computer program product to be installed at a data receiving and displaying device using a computer and having a transmission unit configured to transmit a request to a data transfer device, a reception unit configured to receive a reply message formed by a header portion and a body portion, according to the request from the data transfer device, an analysis unit configured to analyze the reply message and carry out processing according to a message format, and a display unit configured to display processed data, the computer program product comprising: a first computer program code for causing the computer to store a contents data and a feature quantity in correspondence into a memory, when the reply message contains the contents data and the feature quantity in the body portion as a result of analysis by the analysis unit; a second computer program code for causing the computer to search through the memory to check whether the feature quantity identical to the feature quantity contained in the reply message is stored in the memory or not and output a search result, when the reply message contains the feature quantity but no contents data in the body portion as a result of analysis by the analysis unit, and acquire the contents data corresponding to the feature quantity from the memory and output the contents data to the analysis unit, when the feature quantity identical to the feature quantity contained in the reply message is stored in the memory as a result of search; and a third computer program code for causing tile computer to acquire the contents data having the feature quantity identical to the feature quantity contained in the reply message by transmitting the request from the transmission unit to the data transfer device, and output the contents data to the analysis unit, when the feature quantity identical to the feature quantity contained in the reply message is not stored in the memory as a result of search.

According to another aspect of the present invention there is provided a data transfer method for transferring a request received from a client to a server which is a destination of the request, and transferring contents data according to the request received from the server to the client that is a source or the request, comprising: calculating a feature quantity indicating a feature of the contents data, upon receiving the contents data in response to the request; storing the feature quantity and the contents data in correspondence into a memory; searching through the memory to check whether the feature quantity identical to a new feature quantity calculated by the calculating step is stored in the memory or not; transmitting to the client a reply message formed by a header portion and a body portion, which contains the feature quantity in the body portion, when the feature quantity identical to the new feature quantity is stored in the memory; and transmitting to the client the reply message which contains the contents data and the new feature quantity in the body portion, while Storing the new feature quantity and a corresponding contents data in the memory, when the feature quantity identical to the new feature quantity is not stored in the memory.

Other features and advantages of the present invention will become apparent from the following description taken in conjunction with the accompanying drawings.

BRIEF DESCRIPTION OF THE DRAWINGS

FIG. 11 is a diagram showing an exemplary data registered in an FP cache region at the proxy server in the system according to one embodiment of the present invention.

FIG. 13 is a diagram showing an exemplary header portion of the reply message from the proxy server to the Web browser in the system according to one embodiment of the present invention.

FIG. 15 is a diagram showing an exemplary fingerprint portion in the body portion of the reply message in the case where the proxy server carries out a differential transfer in the system according to one embodiment of the present invention.

FIG. 16 is a diagram showing an exemplary difference base FP value in the fingerprint portion in the case where the proxy server carries out a differential transfer in the system according to one embodiment of the present invention.

FIG. 20 is a flow chart showing a procedure or the operation of the proxy server after receiving a reply from a Web server in the system according to one embodiment of the present invention.

FIG. 21 is a diagram showing another exemplary configuration of a reply message from the proxy server to the Web browser in the system according to one embodiment of the present invention.

FIG. 22 is a diagram showing another exemplary body portion of the reply message from the proxy server to the Web browser in the system according to one embodiment of the present invention.

DETAILED DESCRIPTION OF THE INVENTION

Referring now to FIG. 1 to FIG. 22, one embodiment of the data transfer scheme according to the present invention will be described in detail.

(System Configuration)

Figure 1:
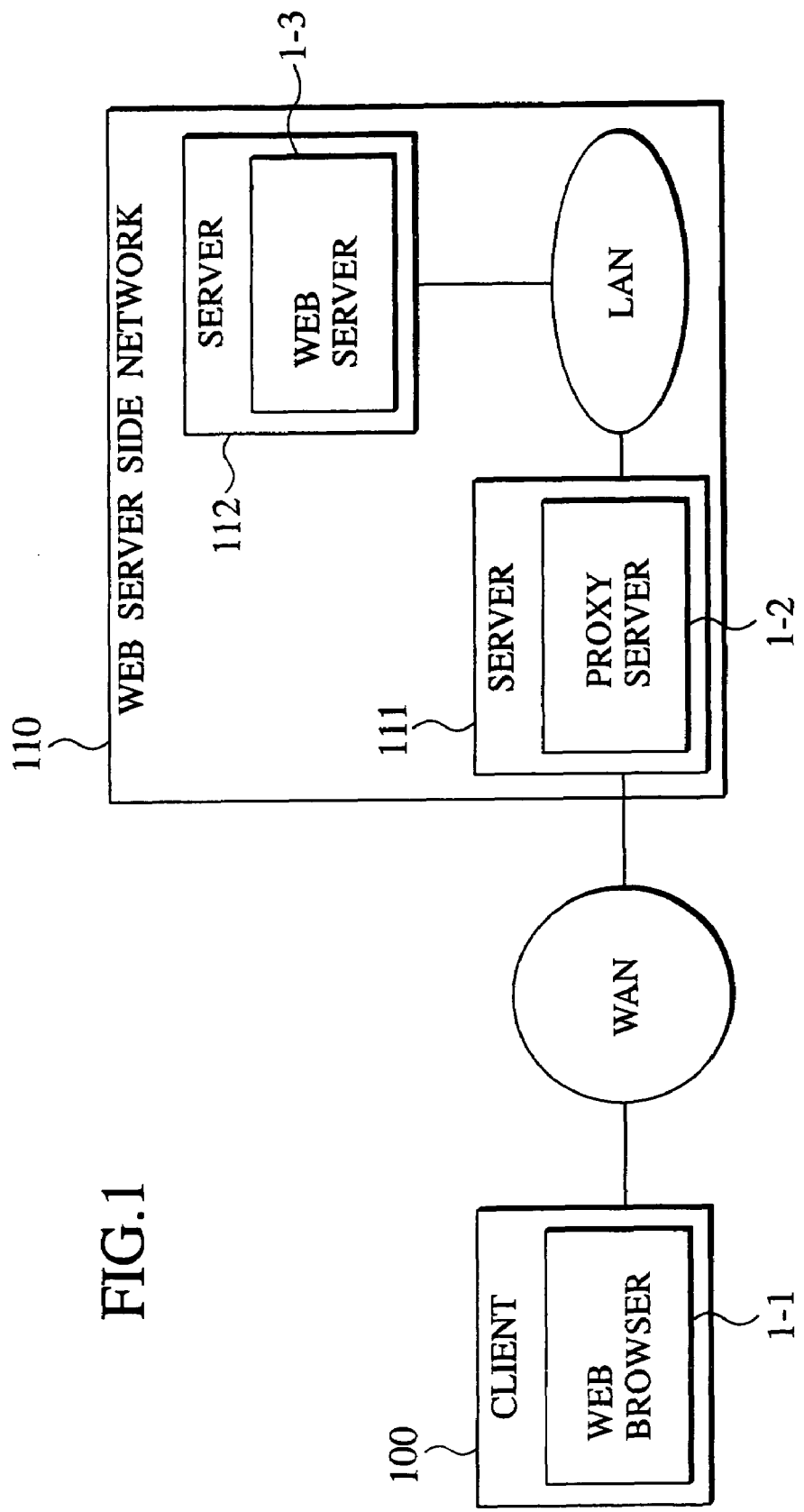
FIG. 1 is a block diagram showing a configuration of a system using a data transfer device according to one embodiment of the present invention.

FIG. 1 shows an exemplary configuration of the Web system according to this embodiment, which has a Web browser 1-1 which is a client, a Web server 1-3 which provides various information and services to the client, and a proxy server 1-2 for reducing the network load by carrying out a temporary storing of data from the Web server 1-3, which are inter-connected through networks.

The Web browser 1-1 is a program operated on a computer of the client 100. The Web browser 1-1 requests the contents data such as that or information or service by accessing the proxy server 1-2 and transmitting a request message based on the HTTP, and receives a reply message obtained as a result. The Web browser 1-1 extracts tile contents data from the received reply message, and displays it on a display screen (not shown) and register it in a cache (not shown), so as to shorten the time required until the display by reading it from the cache in the case of acquiring the same contents data again.

The proxy server 1-2 is a program operated on the server 111 which is a computer belonging to the Web server side network 110, in response to the request message from the Web browser 1-1, the proxy server 1-2 either transmits a reply message by utilizing the contents data existing in the cache (not shown), or in the case where the contents data does not exist in the cache, transfers the request message to the Web server 1-3 to acquire the contents data and transmits a reply message to the Web browser 1-1. Also, by calculating the FP value for the contents data acquired from the Web server 1-3 and registering it in correspondence to the URL and the data, it becomes possible to make a hit for the data in the cache (not shown), even for the substantially identical data with a different URL. The FP value is data which becomes a feature value of the contents data, which is calculated by using a hash function as will be described below.

The Web server 1-3 is a program operated on the server 112 which is a computer belonging to the Web server side network 110. The Web server 1-3 receives a command based on the HTTP from the proxy server 1-2, and transmits the contents data such as that of information or service.

(Data and Command Flow)

The outline of the flow of data and commands among the Web browser 1-1, the proxy server 1-2 and the Web server 1-3 in major six patterns will be described with references to FIG. 2 to FIG. 7.

On the Web browser 1-1 of the present invention, two types of caches are existing, one is a cache for storing the URL and the contents data in correspondence, which is originally provided in the Web browser 101, and another is a cache for storing the FP value of the Present invention and the contents data in correspondence. The cache 1-11 shown in FIG. 2 to FIG. 7 is the latter cache.

Figure 2:
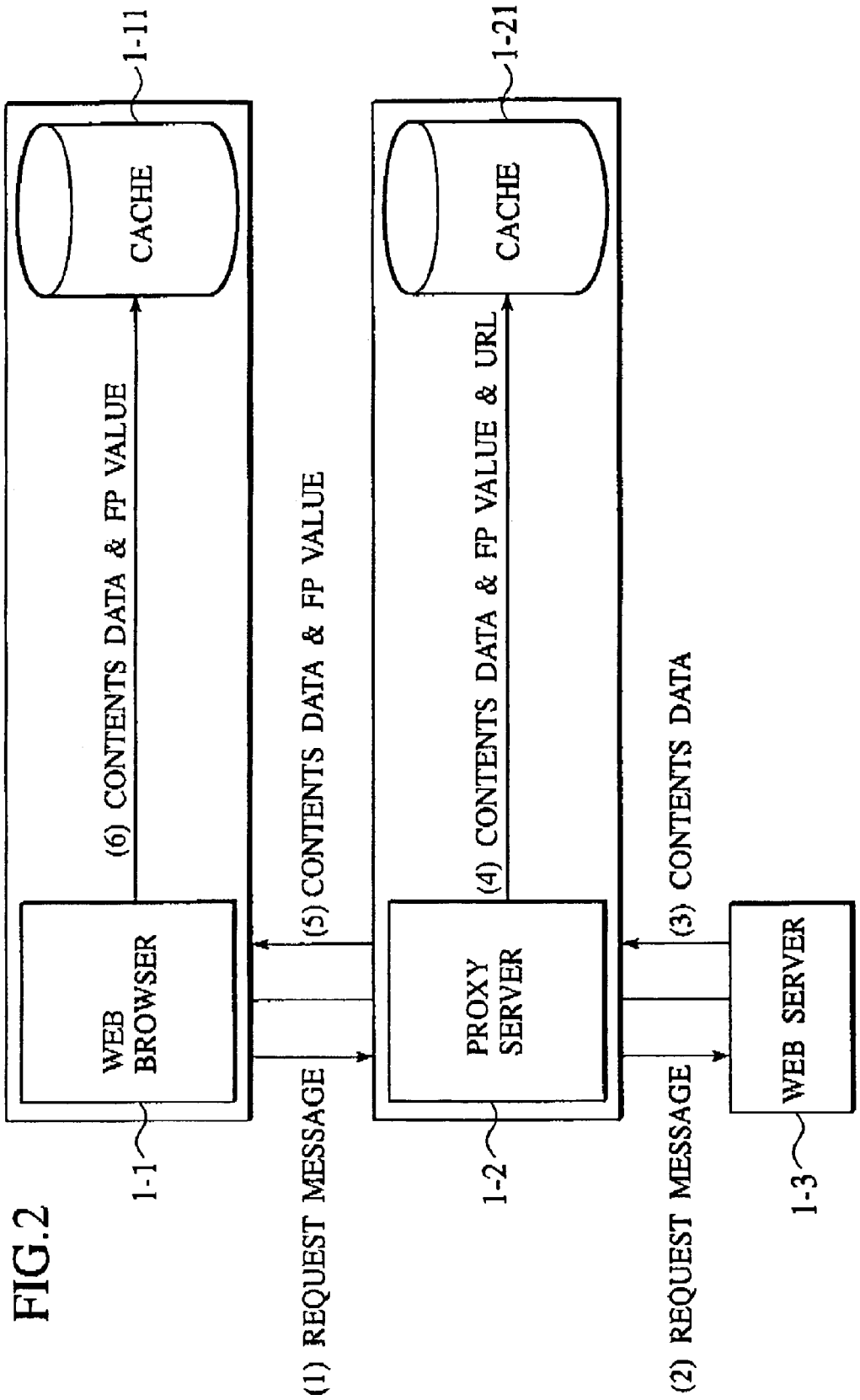
FIG. 2 is a schematic diagram showing one exemplary flow of commands and data in the system according to one embodiment of the present invention.

(A) The case where the contents data requested by the Web browser 1-1 does not exist in the cache 1-21 of the proxy server 1-2 (that is, the case of an initial access to that contents data):

The flow of data and commands in this case is as shown in FIG. 2. (1) The Web browser 1-1 accesses the proxy server 1-2 and transmits the request message for requesting the contents data. (2) The proxy server 1-2 transfers the request message to the Web server 1-3. (3) The Web server 1-3 outputs the contents data according to the request message. (4) The proxy server 1-2 calculates the FP value of the contents data, and registers the contents data and the FP value and the URL in correspondence, into the cache 1-21. (5) Then, the proxy server 1-2 transmits the contents data and the FP value to the Web browser 1-1. (6) The Web browser 1-1 registers the contents data and the FP value in correspondence, into the cache 1-11.

Figure 3:
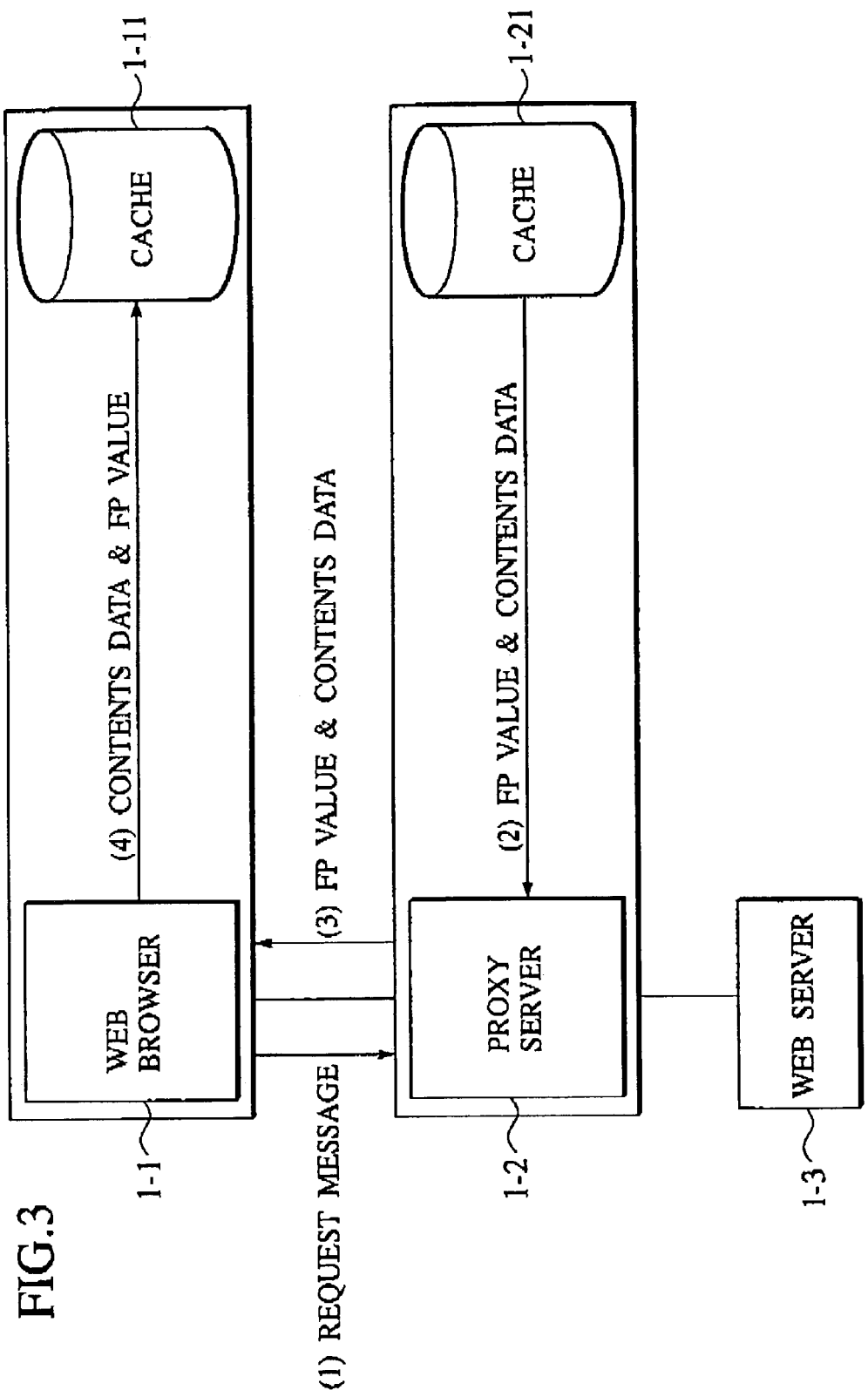
FIG. 3 is a schematic diagram showing another exemplary flow of commands and data in the system according to one embodiment of the present invention.

(B) The case where the contents data requested by the Web browser 1-1 exists in the cache 1-21 of the proxy server 1-2, and there is a hit by the search according to the URL:

The flow of data and commands in this case is as shown in FIG. 3. (1) The Web browser 1-1 accesses the proxy server 1-2 and transmits the request message for requesting the contents data. (2) The proxy server 1-2 extracts the contents data and the FP value corresponding to the URL specified by the request message, from the cache 1-21. (3) The proxy server 1-2 transmits the FP value and the contents data to the Web browser 1-1. (4) The Web browser 1-1 registers the FP value and the contents data in correspondence, into the cache 1-11.

Figure 4:
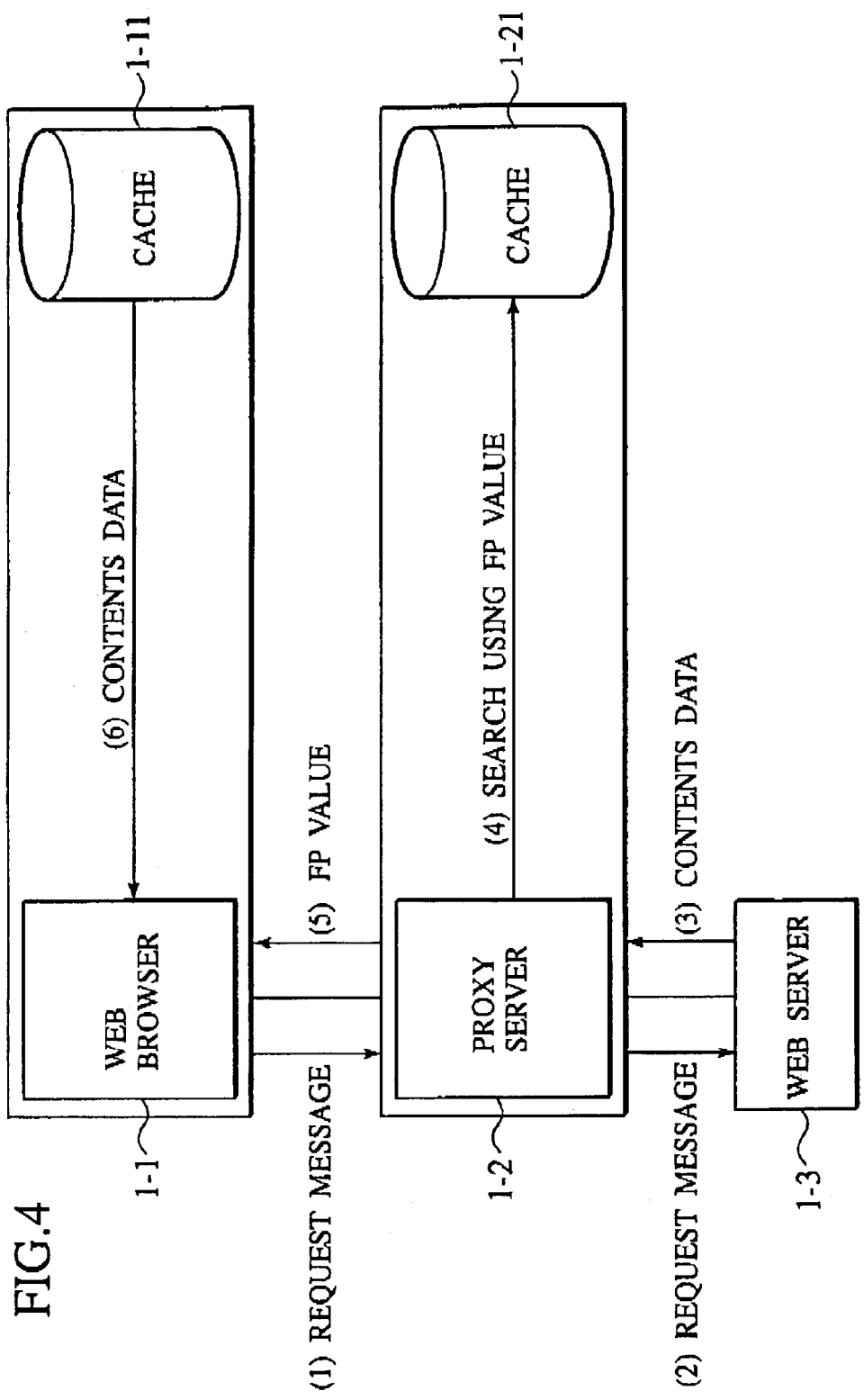
FIG. 4 is a schematic diagram showing another exemplary flow of commands and data in the system according to one embodiment of the present invention.

(C-1) The case where the contents data requested by the Web browser 1-1 exists in the cache 1-21 of the proxy server 1-2 and there is a hit by the search according to the FP value, and the contents data having that FP value also exists in the cache 1-11 of the Web browser 1-1 (the case of compressed transfer):

The flow of data and commands in this case is as shown in FIG. 4. (1) The Web browser 1-11 accesses the proxy server 1-2 and transmits the request message for requesting the contents data. (2) The proxy server 1-2 transfers the request message to the Web server 1-3. (3) The Web server 1-3 outputs the contents data according to the request message. (4) The proxy server 1-2 calculates the FP value of the contents data, and searches the contents data in the cache 1-21 by using the FP value. (5) The proxy server 1-2 transmits the FP value to the Web browser 1-1. (6) The Web browser 1-1 reads out the contents data corresponding to the FP value from the cache 1-11.

Figure 5:
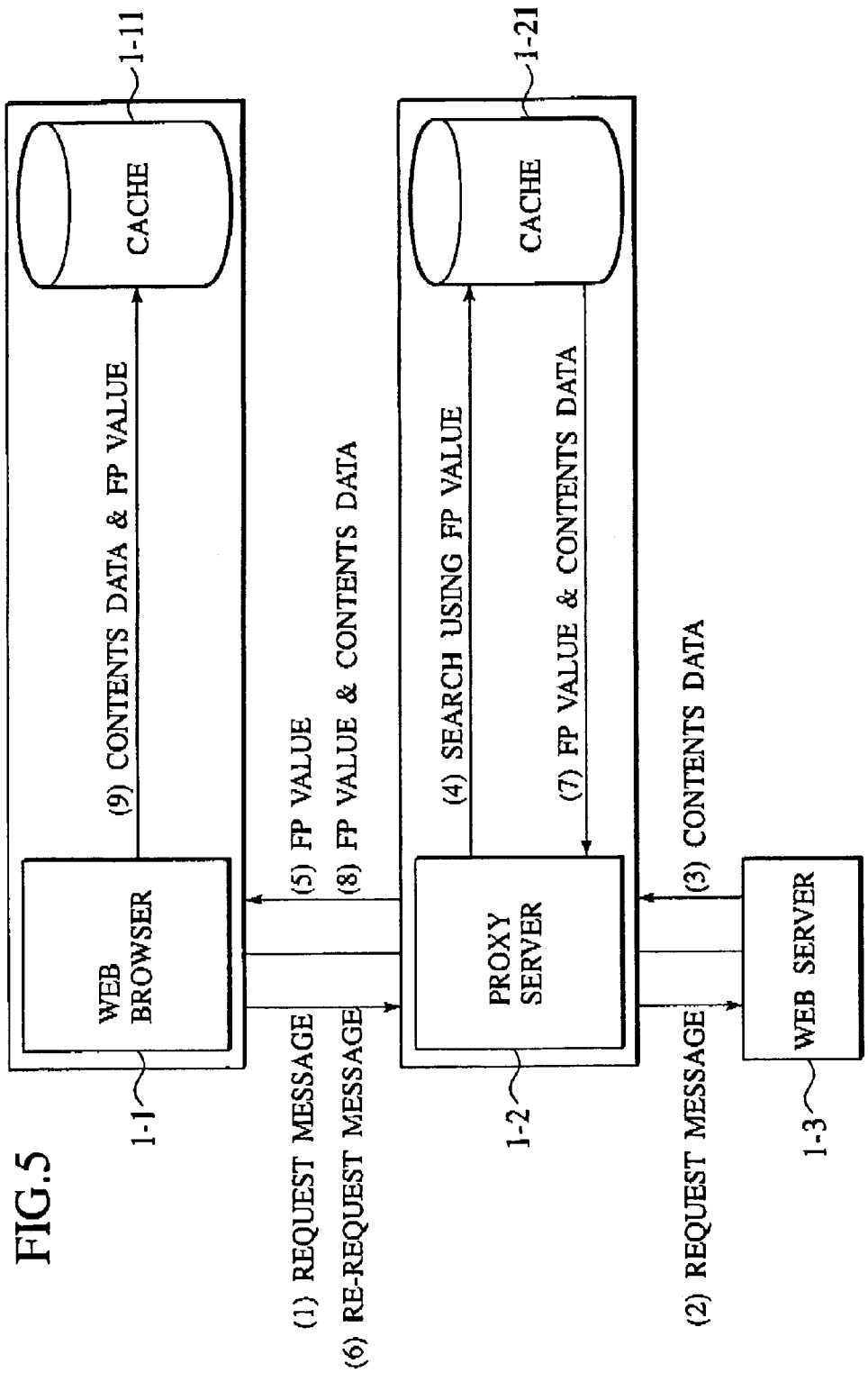
FIG. 5 is a schematic diagram showing another exemplary flow of commands and data in the system according to one embodiment of the present invention.

(C-2) The case where the contents data requested by the Web browser 1-1 exists in the cache 1-21 of the proxy server 1-2 and there is a hit by the search according to the FP value, and the contents data having that FP value does not exist in the cache 1-11 of the Web browser 1-1 (the case of compressed transfer with a re-request):

The flow of data and commands in this case is as shown in FIG. 5. (1) to (5) are the same as (C-1). (6) As the contents data corresponding to the FP value does not exist in the cache 1-11, the Web browser 1-1 transmits a re-request message for requesting the transmission of the contents data to the proxy server 1-2. (7) The proxy server 1-2 extracts the contents data from the cache 1-21 according to the re-request message. (8) The proxy server 1-2 transmits the FP value and the contents data to the Web browser 1-1. (9) The Web browser 1-1 registers the contents data and the FP value in correspondence, into the cache 1-11.

Figure 6:
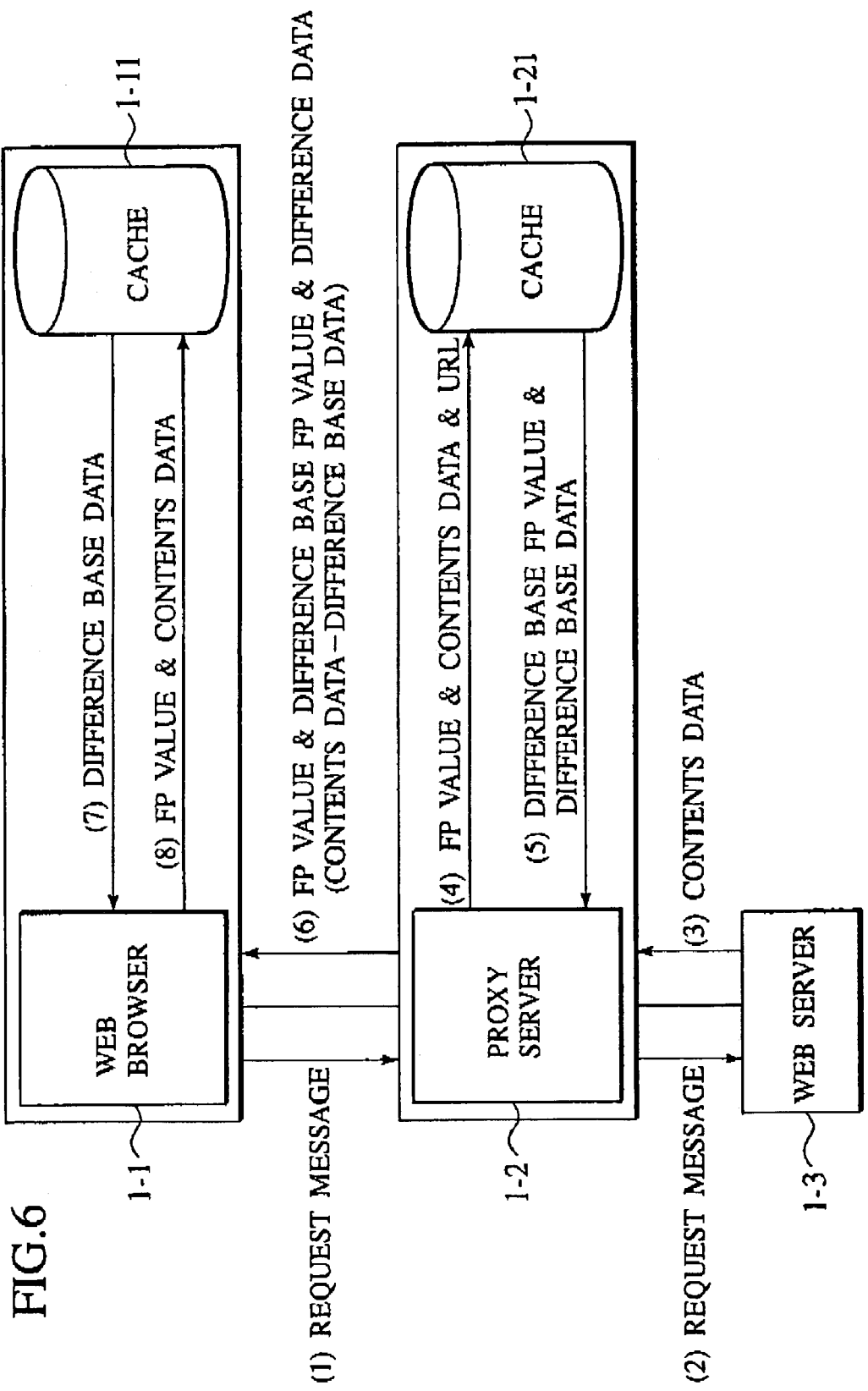
FIG. 6 is a schematic diagram showing another exemplary flow of commands and data in the system according to one embodiment of the present invention.

(D-1) The case where the contents data requested by the Web browser 1-1 does not exist in the cache 1-21 of the proxy server 1-2 and the proxy server 1-2 carries out a differential transfer, and the difference base data necessary for the composition of the contents data from the difference exists in the cache 1-11 of the Web browser 1-1 (the case of differential transfer):

The flow of data and commands in this case is as shown in FIG. 6. (1) The Web browser 1-1 accesses the proxy server 1-2 and transmits the request message for requesting the contents data. (2) The proxy server 1-2 transfers the request message to the Web server 1-3. (3) The Web server 1-3 outputs the contents data according to the request message. (4) The proxy server 1-2 calculates the FP value of the contents data, and registers the FP value, the URL and the contents data in correspondence. (5) The proxy server 1-2 reads out the difference base data and the difference base FP value to be used in the differential transfer from the cache 1-21. (6) The proxy server 1-2 transmits the difference data which is a difference between the contents data and the difference base data, the difference base FP value and the FP value to the Web browser 1-1. (7) The Web browser 1-1 reads out the difference base data corresponding to the difference base FP value from the cache 1-11. (8) The Web browser 1-1 composes the contents data from the difference base data and the difference data, and registers the FP value and the contents data in correspondence, into the cache 1-11.

Figure 7:
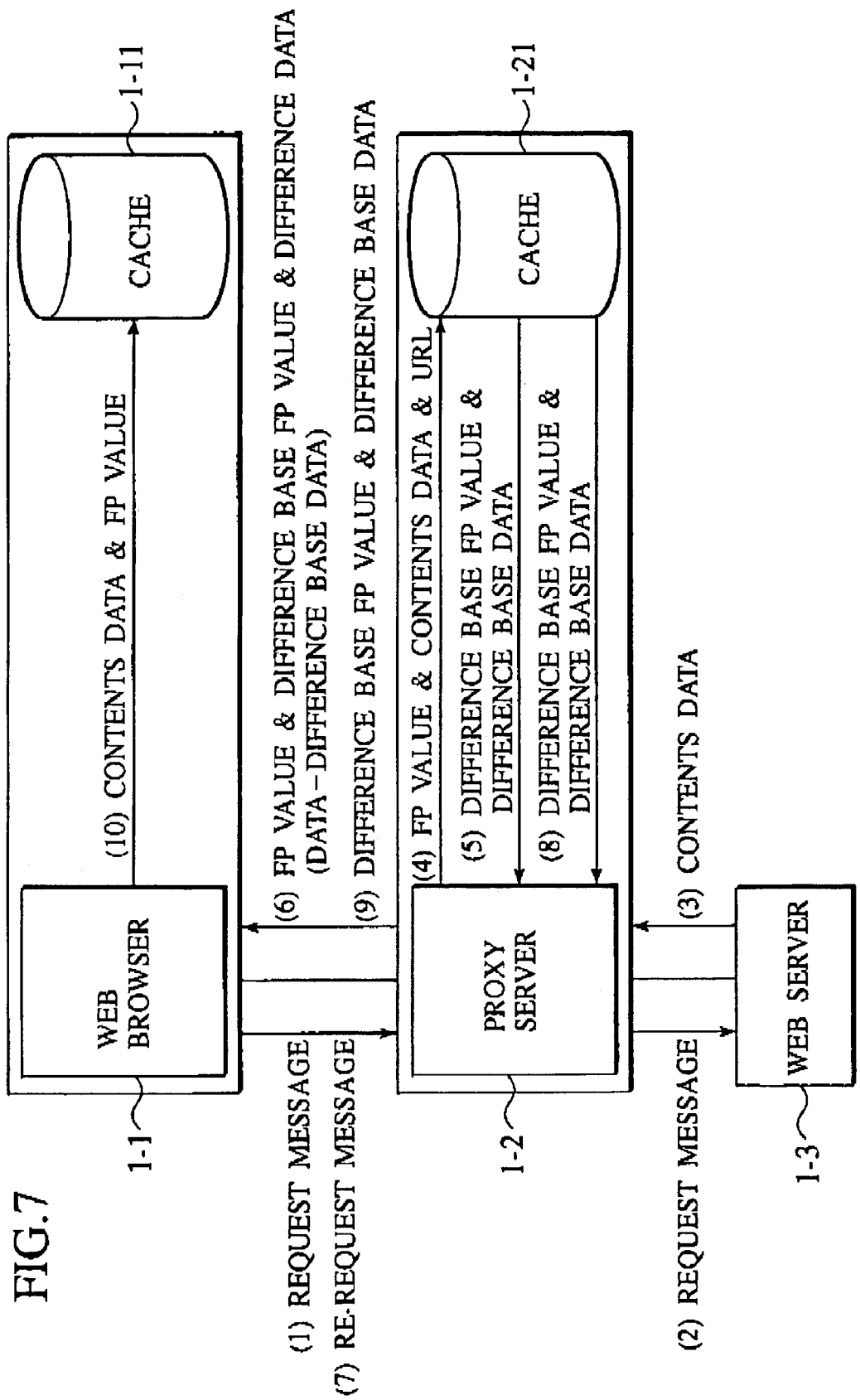
FIG. 7 is a schematic diagram showing another exemplary flow of commands and data in the system according to one embodiment of the present invention.

(D-2) The case where the contents data requested by the Web browser 1-1 does not exist in the cache 1-11 of the proxy server 1-2 and the proxy server 1-2 carries out a differential transfer, and the difference base data necessary for the composition of the contents data from the difference does not exist in the cache 1-11 of the Web browser 1-1 (the case of differential transfer with a re-request):

The flow of data and commands in this case is as shown in FIG. 7. (1) to (6) are the same as (D-1). (7) The Web browser 1-1 transmits the re-request message for requesting data that do not exist in the cache 1-11 among the difference base data, to the proxy server 1-2. (8) The Web browser 1-1 registers the difference base data and the difference base FP value obtained in response to the re-request message in correspondence, into the cache 1-11. (9) The Web browser 1-1 composes the contents data from the difference base data and the difference data, and registers the FP value and the contents data in correspondence, into the cache 1-11.

(Web Browser Configuration)

Figure 8:
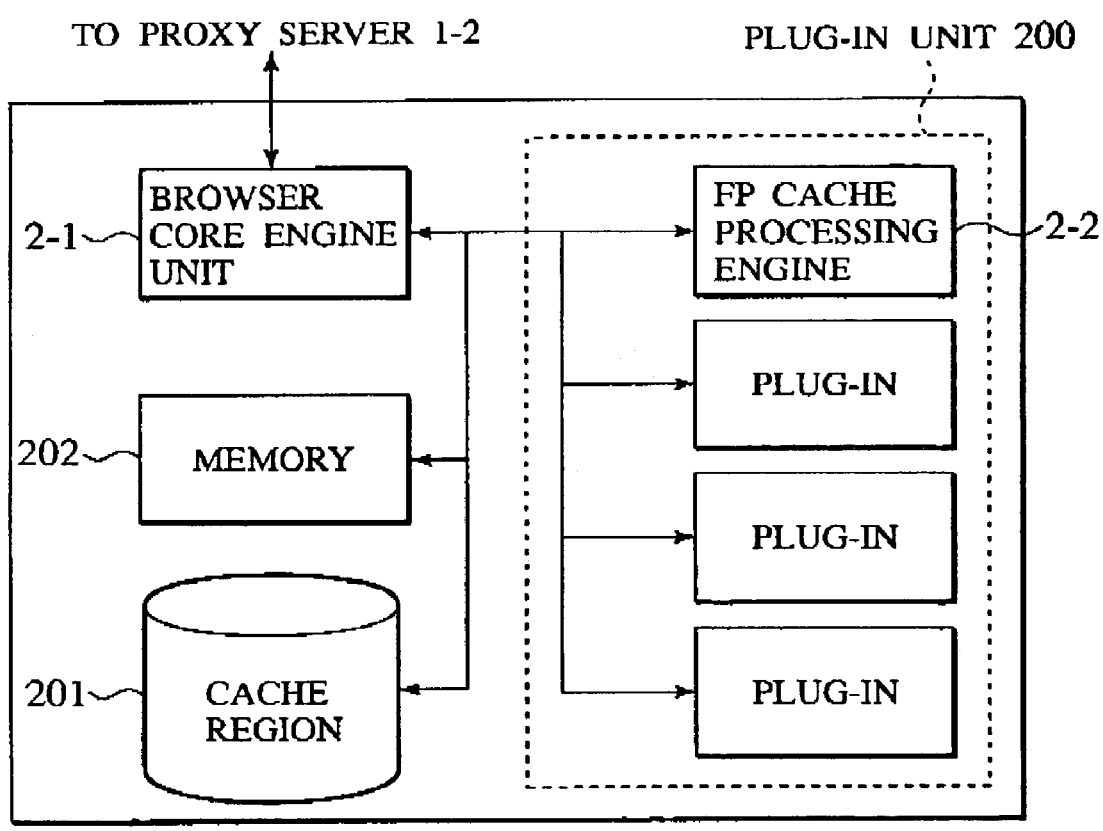
FIG. 8 is a block diagram snowing a configuration of a Web browser in the system according to one embodiment of the present invention.

FIG. 8 shows a configuration of the Web browser 1-1 of this embodiment. The Web browser 1-1 has: a browser core engine unit 2-1 for carrying out interpretation of HTML (HyperText Markup Language) or the like, drawing and display of a display screen, communications with the Web server 1-3 and the proxy server 1-2, and receiving of a request from the user; a plug-in unit 200 for expanding the browser function; an FP cache processing engine 2-2 installed at the plug-in unit 200, for carrying out the FP cache processing; a cache 201 for storing the URL and the contents data in correspondence; and a memory 202 for temporarily storing the received contents data.

The browser core engine unit 2-1 provides functions implemented in the general browser. More specifically, the browser core engine unit 2-1 carries out the search through the cache 201 by utilizing the URL in response to a request from the user, the access to the proxy server 1-2, the analysis and display of the contents data read out from the cache 201, the extraction of the reply data from the reply message received from the proxy server 1-2 and storing it into the memory 202 and analyzing and displaying it. The cache 201 is one that is implemented in the general browser, which stores the URL and the contents data in correspondence.

Figure 9:
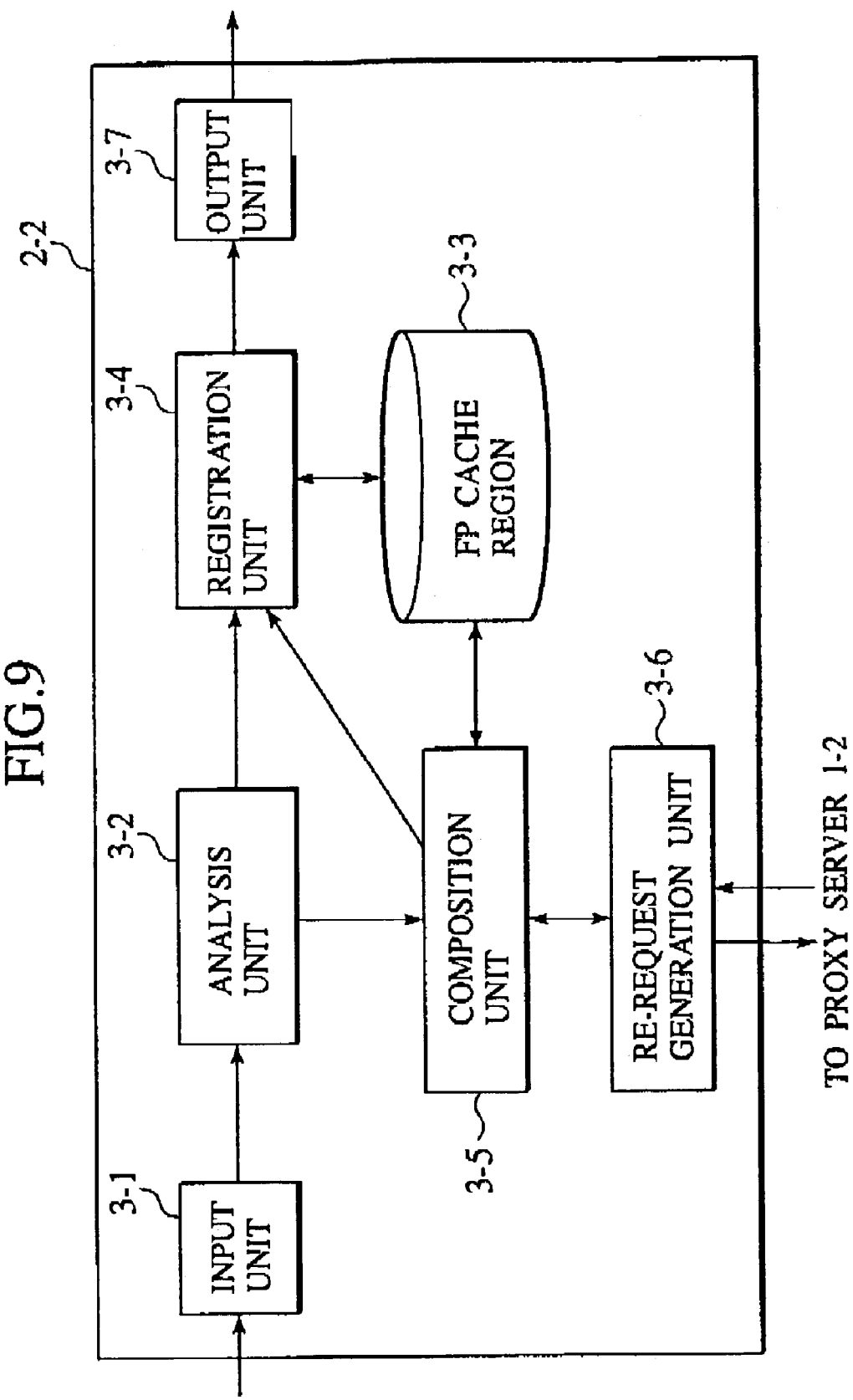
FIG. 9 is a block diagram showing a configuration of an FP cache processing engine on the Web browser in the system according to one embodiment of the present invention.

The FP cache processing engine 2-2 carries out the cache processing utilizing the FP value. The FP cache processing engine 2-2 has a detailed configuration as shown in FIG. 9. The FP cache processing engine 2-2 has an input unit 3-1 for reading out the reply data from the memory 202 by using a memory address received from the browser core engine unit 2-1 of the Web browser 1-1, an analysis unit 3-2 for analyzing the reply data and judging presence/absence of a need to compose the contents data from the FP value, an FP cache region 3-3 for storing the contents data and the FP value extracted from the reply data in correspondence, and a registration unit 3-4 for registering the contents data and the FP value into the FP cache region 3-3. The FP cache region 3-3 corresponds to the cache 1-11 described above. Also, in this embodiment, the FP cache region 3-3 is a separately provided from the cache 201 described above.

In addition, the FP cache processing engine 2-2 has a composition unit 3-5 for carrying out the composition of the contents data from the FP value when it is judged that there is a need for the composition at the analysis unit 3-2, a re-request generation unit 3-6 for acquiring the contents data or the difference base data from the proxy server 1-2 according to a request from the composition unit 3-5, and an output unit 3-7 for finally outputting the contents data to the memory 202.

The input unit 3-1 reads out the reply data from the memory 202 according to an address received from the browser core engine unit 2-1 and outputs it to the analysis unit 3-2.

The analysis unit 3-2 determines a processing policy according to a mode information contained in the reply data. One of a normal transfer (Mode: None), a compressed transfer (Mode: Compress) and a differential transfer (Mode: Differential) is set in the mode information, and the reply data is outputted to the registration unit 3-4 when the mode is the normal transfer, or the reply data is outputted to the composition unit 3-5 when the mode is the compressed transfer or the differential transfer.

The registration unit 3-4 extracts the contents data from the reply data and registers it in correspondence to the FP value into the FP cache region 3-3.

The composition unit 3-5 carries out the composition of the contents data by utilizing tile FP value. In the case of the compressed transfer, the contents data corresponding to the FP value is searched in the FP cache region 3-3. When it does not exists in the FP cache region 3-3, tile FP value is outputted to the re-request generation unit 3-6, to acquire the contents data from the proxy server 1-2. The contents data obtained from the FP cache region 3-3 or the proxy server 1-2 is written into the reply data and outputted to the registration unit 3-4.

In the case of the differential transfer, the different base data corresponding to the difference base FP value is searched in the FP cache region 3-3. When it does not exist in the FP cache region 3-3, the difference base FP value is outputted to the re-request generation unit 3-6, to acquire the difference base data from the proxy server 1-2. Then, the contents data is composed from the difference base data obtained from the FP cache region 3-3 or the proxy server 1-2 and the difference data contained in the reply data, and the composed contents data is written into the reply data and outputted to the registration unit 3-4.

The re-request generation unit 3-6 accesses the proxy server 1-2, and acquires the contents data or the difference base data corresponding to the FP value or the difference base FP value received from the composition unit 3-5. The re-request generation unit 3-6 carries out the communications directly in the HTTP by accessing the proxy server 1-2 without using the browser core engine unit 2-1. At this point, the FP value and a parameter indicating that it is a re-request are transmitted along with a command of the HTTP, to notify that it is different from a normal request, to the proxy server 1-2. More specifically, the FP value and a header indicating that it is a re-request are attached to a request of the HTTP.

The plug-in unit 200 is provided in order to expand the function of the browser core engine unit 2-1. Examples of the Web browsers implemented with the plug-in unit include Netscape (R) Navigator, Netscape (R) Communicator, and Microsoft Internet Explorer (R). These Web browsers become capable of carrying out the processing that is not originally provided, by installing a plug-in provided as software. For example, it becomes possible to activate and control a specific application such as that for a video playback software in the Web browser. In this embodiment, the FP cache processing engine 2-2 is provided in a form of software, and operated by being installed at the plug-in unit 200.

The browser core engine unit 2-1 acquires the contents data in response to a request or the like from the user. First, the search of the cache 201 by utilizing the URL is carried out. When the target contents data exists in the cache 201, that data is used. When it does not exist, the reply data containing the target contents data is acquired by accessing the proxy server 1-2, and stored into the memory 202.

The browser core engine unit 2-1 analyzes the acquired contents data or reply data, and interrupts the analysis and activates the plug-in when the plug-in becomes necessary. At a time of activating the plug-in, an address of the contents data or the reply data stored in the memory 202 is outputted. Then, when the plug-in processing is finished, the analysis of the contents data is resumed and the display or the like is carried out.

The FP cache processing engine 2-2 is activated from the browser core engine unit 2-1 similarly as the other plug-in. At a time of the activation, an address of the reply data stored in the memory 202 is received from the browser core engine unit 2-1, the cache processing using the FP value is carried out with respect to the reply data, and the result is outputted to the browser core engine unit 2-1.

(Proxy Server Configuration)

Figure 10:
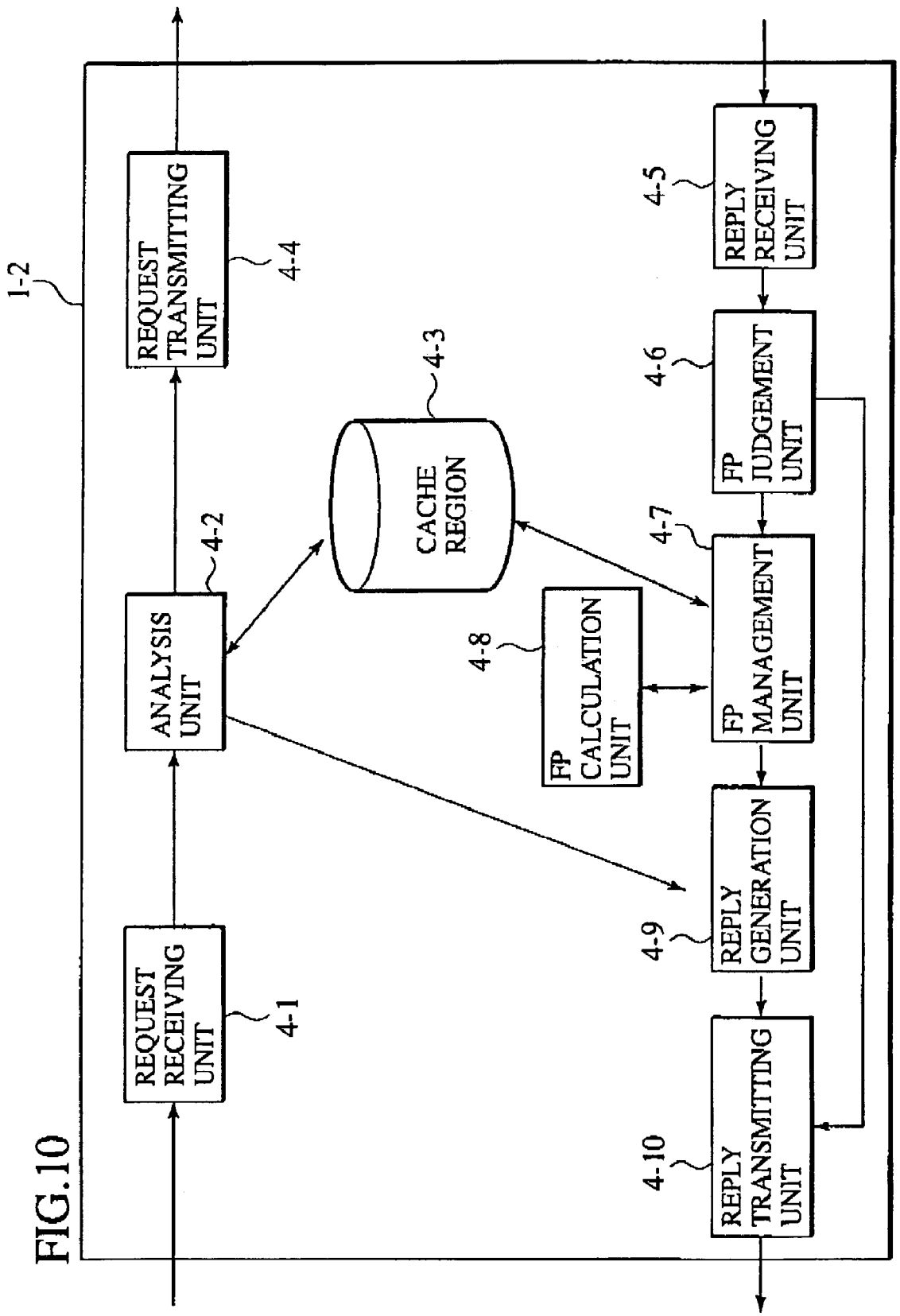
FIG. 10 is a block diagram showing a configuration of a proxy server in the system according to one embodiment of the present invention.

FIG. 10 shows a configuration of the proxy server of this embodiment. The proxy server 1-2 has a request receiving unit 4-1 for receiving the request message from the Web browser 1-1, an analysis unit 4-2 for analyzing the request message from the Web browser 1-1 and makes a watching with the cache, a request transmitting unit 4-4 for transferring the request message to the Web server 1-3, and a cache region 4-3 for storing the FP value, the URL and the contents data in correspondence. This cache region 4-3 corresponds to the cache 1-21 described above.

In addition, the proxy server 1-2 also has a reply receiving unit 4-5 for receiving a reply and the contents data from the Web server 1-3, an FP judgement unit 4-6 for judging whether the received contents data should be subjected to the FP cache processing or not, an FP calculation unit 4-8 for calculating the FP value of the received contents data, an FP management unit 4-7 for searching through the cache region 4-3 according to the FP value, a reply generation unit 4-9 for generating the reply data by attaching a prescribed information to the contents data, and a reply transmitting unit 4-10 for transmitting the reply message containing the reply data to the Web browser 1-1.

The request receiving unit 4-1 receives the request message based on the HTTP from the Web browser 1-1.

The analysis unit 4-2 analyzes the received request message. Then, as in the case (B) described above, when the contents data corresponding to the URL, contained in the request message from the Web browser 1-1 exists in the cache region 4-3, the contents data and the corresponding FP value are read out from the cache region 4-3 and outputted to the reply generation unit 4-9. Note that when the contents data corresponding to the URL does not exist, the request message is outputted to the request transmitting unit 4-4.

Also, when the re-request message is transmitted from the Web browser 1-1 as in the case (C-2) or (D-2) described above, the corresponding contents data is read out from the cache region 4-3, and outputted to the reply generation unit 4-9 along with a notice indicating that it is an operation in response to the re-request message.

The cache region 4-3 stores the contents data acquired from the Web server 1-3 by the proxy server 1-2, the FP value calculated for this contents data, and the URL of this contents data, in correspondence. From the property of the FP value, there is basically one FP value corresponding to one contents data. There may be a plurality of URLs with respect to one data. FIG. 11 shows an exemplary data stored by the cache region 4-3, where a set of the URL, the overall FP value of the contents data, and the line by line FP values of each line of the contents data are stored.

The request transmitting unit 4-4 transfers the request message from the Web browser 1-1 to the Web server 1-3. Then, the reply receiving unit 4-5 receives the contents data from the Web browser 1-1.

The FP judgement unit 4-6 judges whether a format of the contents data received from the Web browser 1-1 is compatible with the FP or not. In this embodiment, the data format that is not compatible with the FP includes the image data and the stream data. When the contents data is in a format that is not compatible with the FP, the FP judgement unit 4-6 outputs the contents data as it is to the reply transmitting unit 4-10.

The FP management unit 4-7 controls the FP calculation unit 4-8 to calculate the FP value of the received contents data. Then, the contents data having the same FP value is searched in the cache region 4-3 by using the obtained FP value. When the contents data having the same FP value cannot be found, the FP value and the contents data are registered in correspondence into the cache region 4-3, whether the differential transfer is possible or not is checked, and if the differential transfer is possible, the difference data is calculated.

Whether or not to carry out the differential transfer is judged according to whether the contents data similar to the received contents data exists in the cache region 4-3 or not. The judgement of similarity is made by comparing the received contents data and the contents data stored in the cache region 4-3 in units of line. As described above, each line of the contents data stored in the cache region 4-3 is stored along with the FP value, so that it is compared with the FP value of each line of the received contents data, and when the FP values coincide for more than a prescribed number of lines, it is judged that the similarity is high and the differential transfer is carried out.

The FP calculation unit 4-8 calculates the FP value of the contents data given from the FP management unit 4-7. The calculation of the FP value is made by using a hash function such as MD-5 or SHA-1 used for the electronic signature. These hash functions have properties that arbitrary data is converted into a hash value in 128 bits when the MD-5 is used or into a hash value of 160 bits when the SHA-1 is used. Also, these hash functions are such that, when two data X and Y are given, the hash value H(X) for X and the hash value H(Y) for Y become equal if X and Y are identical data, but H(X) and H(Y) have different values at a very high probability if X and Y are different data. In principle, the hash value can become identical for different data, but the probability for that to happen is extremely low. Consequently, the possibility for two significant data to have the identical hash value can be ignored in practice. Note that the calculation of the FP value is not necessarily limited to the use of the hash function, and it is also possible to use a compression algorithm or the like, for example.

The reply generation unit 4-9 generates the reply message to be transmitted to the Web browser 1-1 by the reply transmitting unit 4-10.

Note that, in this embodiment, the FP value is calculated by the FP calculation unit 4-8 only when the contents data is judged as having a format compatible with the FP by the FP judgement unit 4-6, but it is also possible to make the judgement after calculating the FP value.

(Configuration of the Reply Message to be Transmitted from the Proxy Server to the Web Browser)

Figure 12A:
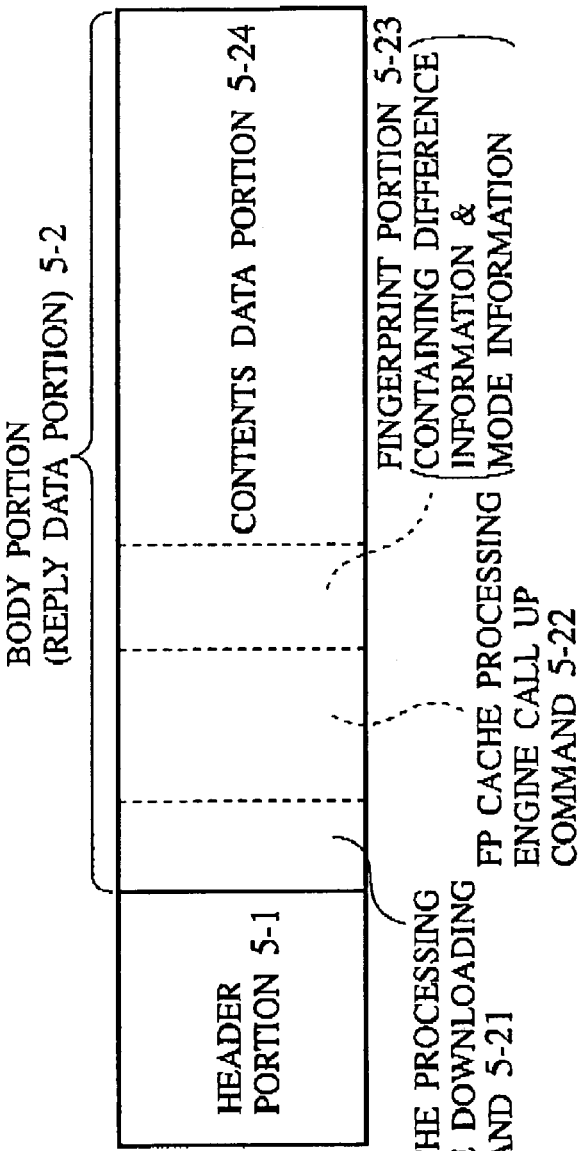
FIGS. 12A and 12B are diagrams showing exemplary configurations of a reply message from the proxy server to the Web browser in the system according to one embodiment of the present invention.

FIG. 12A shows an exemplary configuration of the reply message generated by the reply generation unit 4-9. The reply generation unit 4-9 generates the reply message having a header portion 5-1 and a body portion 5-2, according to the HTTP. The body portion 5-2 is the reply data generated by the proxy server 1-2, which contains an FP cache processing engine downloading command 5-21, an FP cache processing engine call up command 5-22, a fingerprint portion 5-23, and a contents data portion 5-24. The header portion 5-1 contains information such as a status, a data format, etc., with respect to the request, as shown in FIG. 13. This format is a standard one for the HTTP.

The FP cache processing engine downloading command 5-21 contains a command for downloading the FP cache processing engine 2-2 to the Web browser 1-1 and installing it at the plug-in unit 200 when the Web browser 1-1 does not have the FP cache processing engine 2-2. Consequently, when the Web browser 1-1 already has the FP cache processing engine 2-2, the FP cache processing engine downloading command 5-21 does not do anything.

The FP cache processing engine call up command 5-22 contains a command for operating the cache function using the FP value by calling up the FP cache processing engine 2-2 installed at the plug-in unit 200 of the Web browser 1-1.

The FP cache processing engine downloading command 5-21 and the FP cache processing engine call up command 5-22 are executed when the browser core engine unit 2-1 analyzes the reply data.

The fingerprint portion 5-23 contains the FP value calculated by the FP calculation unit 4-8 and an identifier indicating a current transfer mode (the differential transfer, the compressed transfer utilizing the FP cache, or the normal transfer not utilizing the cache). In the case of carrying out the differential transfer, the difference data is also contained here.

The contents data portion 5-24 is the contents data obtained from the Web server 1-3 or read out from the cache region 4-3.

Figure 14:
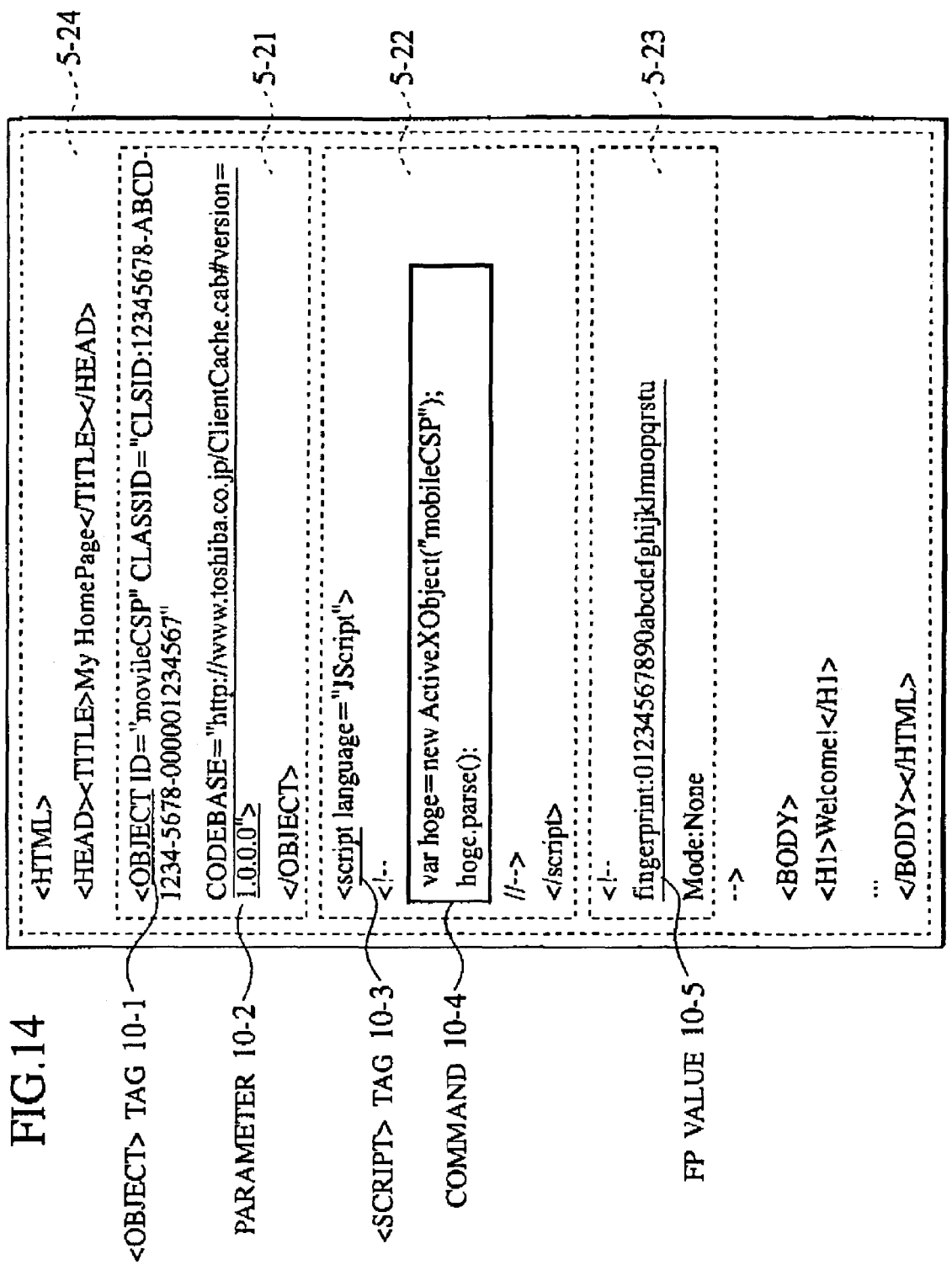
FIG. 14 is a diagram showing an exemplary body portion of the reply message from the proxy server to the Web browser in the system according to one embodiment of the present invention.

More specifically, the body portion 5-2 has a configuration as shown in FIG. 14. In this configuration, the contents data portion 5-24 is in the HTML format, and the FP cache processing engine downloading command 5-21, the FP cache processing engine call up command 5-22 and the fingerprint portion 5-23 are embedded in the contents data portion 5-24. Also, the commands effective in the case of using the Microsoft Internet Explorer (R) as the Web browser 1-1 are used.

The FP cache processing engine downloading command 5-21 is described by using <OBJECT> tag of the HTML. This tag is for use in inserting various objects such as image, audio, video, application, etc., from another file. When the browser core engine unit 2-1 of the Web browser 1-1 analyzes the HTML file and finds this tag, the browser core engine unit 2-1 downloads the specified file and execute it automatically.

In this embodiment, the file of the ActiveX (R) control of the FP cache processing engine 2-2 is specified by a parameter 10-2 in the <OBJECT> tag 10-1. In the case where the specified file is not installed yet, the Web browser 1-1 downloads it from "http://www.toshiba.co.jp/ClientProxy-.cab" and installs it. This file may exist on the same server as the proxy server 1-2, or on a place other than the proxy server 1-2.

The FP cache processing engine call up command 5-22 is described in the script language described in a region specified by <SCRIPT> tag 10-3 of the HTML. The Web browser 1-1 interpret a content described between <SCRIPT> and </SCRIPT> in the HTML file as a command in the script language.

In this embodiment, the FP cache processing engine call up command 5-22 is described by using the JScript of the Microsoft (R) corporation, and a command 10-4 corresponds to this. When the command 10-4 is executed, the FP cache processing engine 2-2 starts the operation, and a memory address stored in the body portion 5-2 is also notified at the same time.

The fingerprint portion 5-23 is embedded immediately after the FP cache processing engine call up command 5-22 as an FP value 10-5. In addition, the transfer mode information is also embedded, such that the FP cache processing engine identifies which one or the differential transfer (Mode: Differential), the compressed transfer using the FP value (Mode: Compress), and the normal transfer not using the cache (Mode: None) is carried out. In the case of carrying out the differential transfer, tile difference data is also embedded along with the FP value. FIG. 15 shows an example of the fingerprint portion 5-23 in the case of carrying out the differential transfer. The fingerprint portion 5-23 has an FP value 1011 and a difference data 1012, where the difference data 1012 contains ordinary data "Tomorrow's schedule <br>", "8:10 Arrival <br>", etc., along with the difference base FP values 1013, 1014 and 1015.

FIG. 16 shows a configuration of the difference base FP value. The difference base FP value contains an identifier 1021 indicating that it is a line inserted by the difference base FP value, a referred line indicator 1022 indicating lines to be referred by the difference base data, and an FP value 1023 of the difference base data. In the example of FIG. 16, it is indicated that the first line to the fifth line (L1-L5) of the data having the FP value "0]defghijmno23k14567890abcpqrstu" are to be referred. In the FP cache processing engine 2-2, these lines are interpreted and appropriate data arc inserted.

Note that this is an example effective in the Microsoft Internet Explorer (R), but it is also possible to realize a similar implementation by using the other script language such as JavaScript (R) that can be used in the HTML file.

Figure 12B:
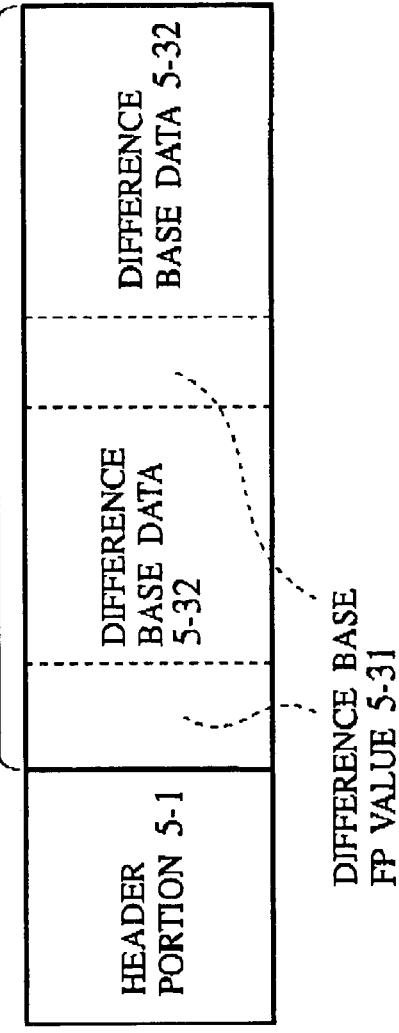

The above description is directed to the reply message for the request from the browser core engine unit 2-1 of the Web browser 1-1. When the reply generation unit 4-9 receives a notice indicating that it is the operation in response to the re-request message from the analysis unit 4-2, it is the reply message for the re-request from the re-request generation unit 3-6 of the FP cache processing engine 2-2, so that the FP cache processing engine downloading command 5-21 and the FP cache processing engine call up command 5-22 described above are unnecessary. Consequently, as shown in FIG. 12B, the reply message in which a difference base FP value 5-31 and a difference base data 5-32 are set in the body portion 5-2 is generated.

(Web Browser Operation)

The browser core engine unit 2-1 of the Web browser 1-1 transmits the request message to the proxy server 1-2 in response to the request of the user, and in response, the proxy server 1-2 generates the reply data by embedding the FP value and the commands related to the FP cache processing engine 2-2 into the contents data as described above, and returns the reply message.

Figure 17:
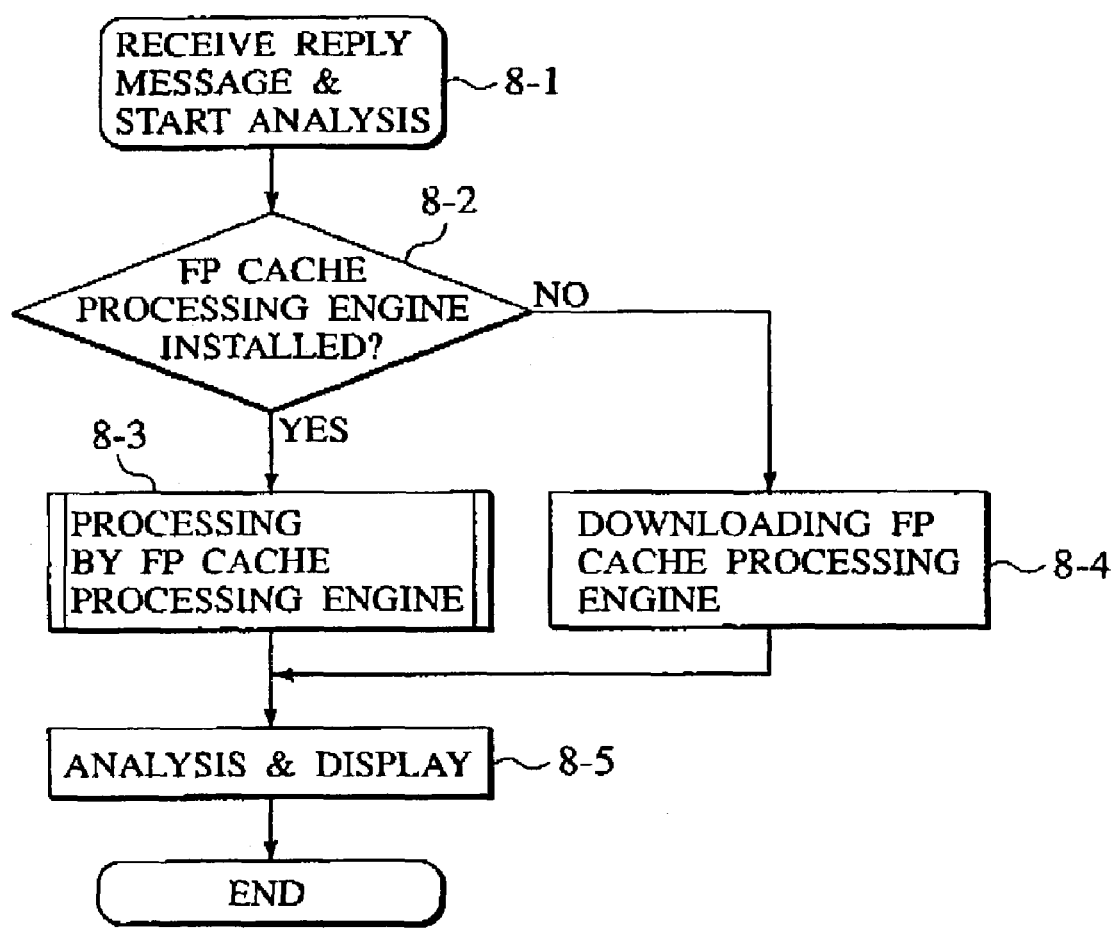
FIG. 17 is a flow chart showing a procedure or the operation of the Web browser after receiving the reply message from the proxy server in the system according to one embodiment of the present invention.

FIG. 17 shows a procedure for the operation of the browser core engine unit 2-1 after the reply message is received from the proxy server 1-2.

The browser core engine unit 2-1 receives the reply message from the proxy server 1-2, and stores the body portion 5-2 of the reply message into the memory 202. As shown in FIG. 14, the body portion 5-2 contains the FP cache processing engine downloading command 5-21, the FP cache processing engine call up command 5-22, the fingerprint portion 5-23, and the contents data portion 5-24. Then, the browser core engine unit 2-1 starts the analysis of the body portion 5-2 (step 8-1).

First, whether there is a need to execute the FP cache processing engine downloading command 5-21 or not, that is whether the FP cache processing engine 2-2 is installed at the plug-in unit 200 of the Web browser 1-1 or not, is checked (step 8-2). If it is not installed, it is downloaded and installed (step 8-4), the analysis of the reply data is resumed when the install is completed, and the analysis result is displayed on a display screen (not shown) (step 8-5).

If it is already installed, the FP cache processing engine call up command 5-22 is executed, and the processing by the FP cache processing engine 2-2 that is the plug-in is carried out (step 8-3). Then, when the processing of the FP cache processing engine 2-2 is completed, the reply data analysis is resumed, and the analysis result is displayed on the display screen (not shown) (step 8-5).

Figure 18:
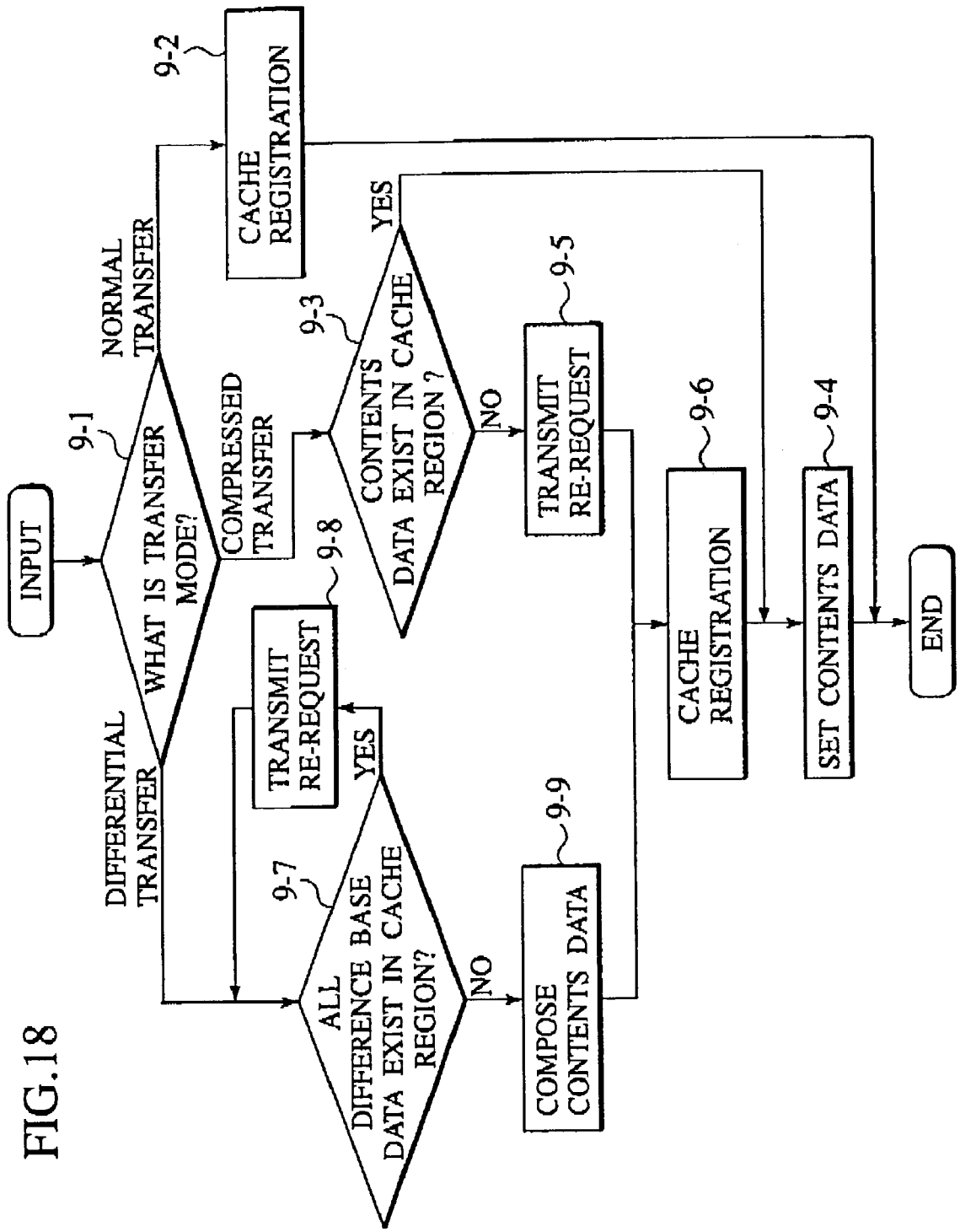
FIG. 18 is a flow chart showing a procedure of the processing by an FP cache processing engine on the Web browser in the system according to one embodiment of the present invention.

Next, the operation of the FP cache processing engine 2-2 will be described with reference to FIG. 18.

As the browser core engine unit 2-1 executes the FP cache processing engine call up command 5-22, the FP cache processing engine 2-2 starts the processing by receiving the address of the memory 202 that stores the body portion (reply data) 5-2. The FP cache processing engine 2-2 reads out the body portion 5-2 from the memory 202, and checks the mode information in the fingerprint portion 5-23 (step 9-1).

When the transfer mode is the normal transfer (Mode: None), the content of the contents data portion 5-24 and the FP value in the fingerprint portion 5-23 are registered into the FP cache region 3-3 (step 9-2). Then, the processing of the FP cache processing engine 2-2 is finished.

When the transfer mode is the compressed transfer using the FP value (Mode: Compress), the contents data having the same FP value is searched in the FP cache region 3-3 by using the FP value in the fingerprint portion 5-23 (step 9-3). When the contents data having the same FP value exists in the EP cache region 3-3, the contents data found in the FP cache region 3-3 is outputted to the memory 202 (step 9-4).

When the contents data having the same FP value does not exist in the FP cache region 3-3, the FP cache processing engine 2-2 transmits the re-request message to the proxy server 1-2 and acquires the contents data (step 9-5). Then, the acquired contents data is registered into the FP cache region 3-3 along with the FP value (step 9-6), and the contents data is stored into the memory 202 by executing the step 9-4. Then, the processing of the FP cache processing engine 2-2 is finished.

On the other hand, when the transfer mode is the differential transfer (Mode: Differential), the differential transfer is carried out so that the difference base data which is the contents data corresponding to the difference base FP value is searched in the FP cache region 3-3. In the case of the differential transfer, there can be a plurality of difference base FP values, so that the search is carried out for all the difference base FP values (step 9-7).

When even one difference base data corresponding to the difference base FP value does not exist, the FP cache processing engine 2-2 transmits the re-request message to the proxy server 1-2, and acquires the necessary difference base data (step 9-8). Then, when all the difference base data are obtained, the contents data is composed by using the difference base data and the difference data (step 9-9).

The composed contents data and the FP value are registered in correspondence into the FP cache region 3-3 by executing the step 9-6, and the composed contents data is outputted to the memory 202 and stored as the contents data portion 5-24 of the body portion 5-2 by executing the step 9-4. Then, the processing of the FP cache processing engine 2-2 is finished.

(Proxy Server Operation)

Figure 19:
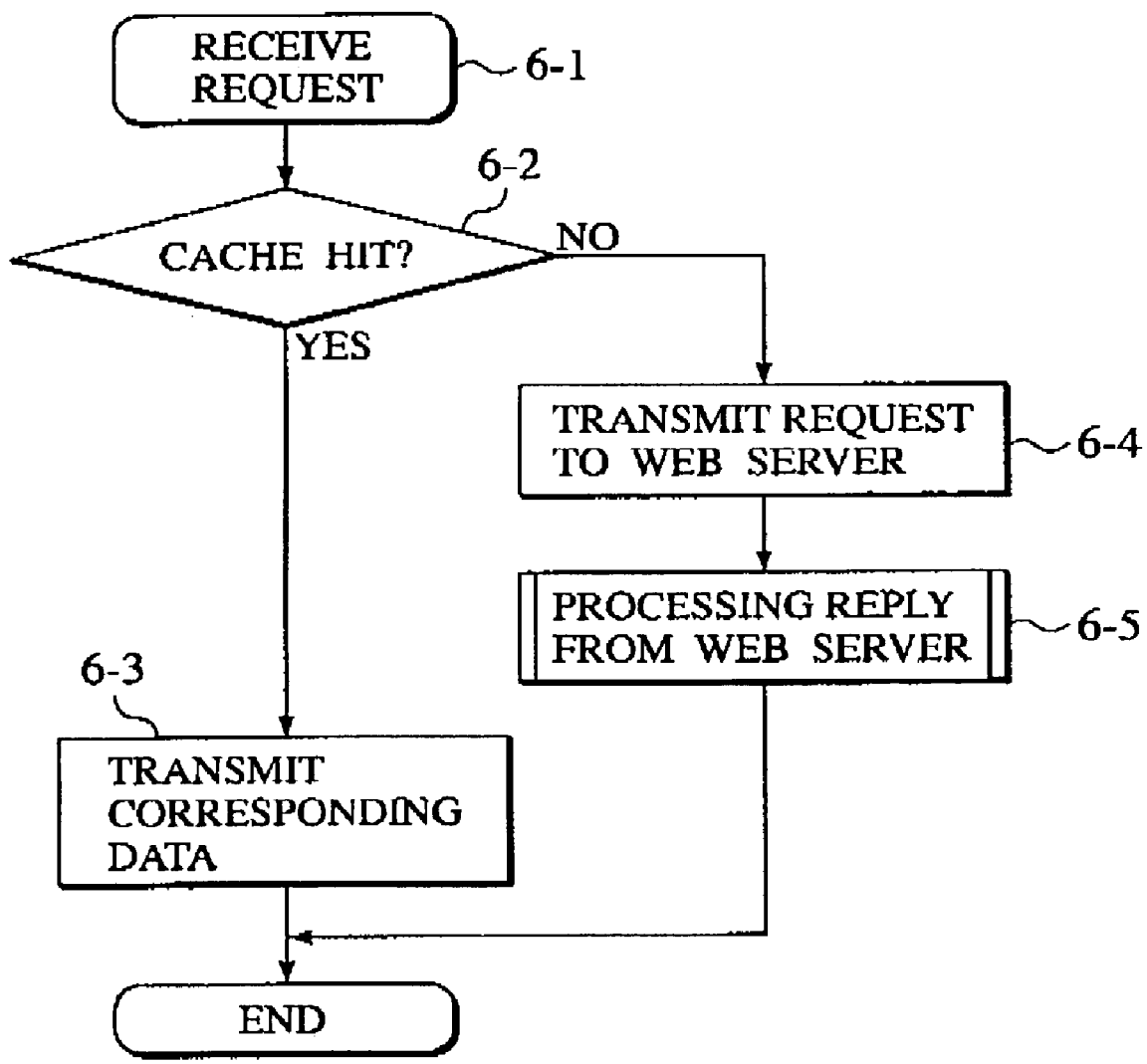
FIG. 19 is a flow chart showing a procedure of the operation of the proxy server after receiving a request from the Web browser in the system according to one embodiment of the present invention.

FIG. 19 shows a procedure for the operation of the proxy server 1-2 in the case or receiving tile request message from the Web browser 1-1.

The proxy server 1-2 analyzes the request message received from the Web browser 1-1 and extracts information such as the URL (step 6-1). Then, whether the contents data corresponding to that URL exists in the cache region 4-3 or not is checked according to the URL (step 6-2).

When the contents data exists in the cache region 4-3, the corresponding contents data and the FP value are read out from the cache region 4-3, and the reply data is generated and transmitted to the Web browser 1-1 (step 6-3).

When the contents data does not exist in the cache region 4-3, the request message is transferred to the Web server 1-3 and the corresponding contents data is acquired (step 6-4).

Then, the caching processing is carried out for the contents data contained in the reply from the Web server 1-3 (step 6-5).

FIG. 20 shows a procedure for the operation of the proxy server 1-2 in the case of receiving the reply from the Web server 1-3 and carrying out the caching processing and the processing for generating the body portion (reply data) of the reply message to be sent to the Web browser 1-1.

The reply from the Web server 1-3 is received and the contents data is extracted (step 7-1), and whether the extracted contents data is an FP cache target data or not is checked (step 7-2).

In the case of the contents data that is not the FP cache target such as images or stream data, it is transmitted as it is as the reply data, without carrying out the FP cache processing (step 7-11).

In the case of the FP cache target data, the FP value of the contents data is calculated (step 7-3). Then, the cache region 4-3 is searched through according to the FP value, to find the contents data having the same FP value (step 7-4).

When the contents data having the same FP value exists, only the FP value will be transmitted to the Web browser 1-1 instead of the contents data, so that the FP value of the contents data and the transfer mode information indicating the compressed transfer (Mode: Compress) are set in the fingerprint portion 5-23 of the body portion 5-2 (step 7-5). Then, the FP cache processing engine downloading command 5-21 and the FP cache processing engine call up command 5-22 are set (step 7-10).

When the contents data having the same FP cache does not exist, the contents data, the FP value and the URL, are registered in correspondence into the cache region 4-3 (step 7-6). In addition, the FP value comparison with the data in the FP cache region is carried out in units of line, in order to check whether the differential compression is possible or not (step 7-7).

When the differential compression is possible, that is when the difference base data having the similarity greater than or equal to a prescribed threshold exists, the difference data between the contents data and the difference base data is generated, and the difference data, the FP value of the difference base data are set in the fingerprint portion 5-23 of the body portion 5-2.

When the differential compression is not possible, the contents data is set in the contents data portion 5-24 of tile body portion 5-2.

Then, the FP value of the contents data and the transfer mode information (Mode: Differential in the case of carrying out the differential compression, Mode: None in the case of not carrying out the differential compression) are set in the fingerprint portion 5-23 of the body portion 5-2 (step 7-5), and the FP cache processing engine downloading command 5-21 and the FP cache processing engine call up command 5-22 of the body portion 5-2 are set (step 7-10).

(Another Exemplary Configuration of the Reply Message to be Transmitted from the Proxy Server to the Web Browser)

FIG. 21 shows another exemplary configuration of the reply message to be generated by the reply generation unit 4-9. The reply generation unit 4-9 generates the reply message having a header portion 21-1 and a body portion 21-2, according to the HTTP.

The body portion 21-2 is the reply data generated by the proxy server 1-2, which contains an FP cache processing engine downloading command 21-21, an FP cache processing engine call up command 21-22, and a contents data 21-23.

The header portion 21-1 and the FP cache processing engine downloading command 21-21 are the same as the header portion 5-1 and the FP cache processing engine downloading command 5-21 described above, so that their description will be omitted here.

The FP cache processing engine call up command 21-22 contains a command for operating the cache function using the FP value by calling up the FP cache processing engine 2-2 installed at the plug-in unit 200 or the Web browser 1-1, an FP value 21-60, and a mode information 21-61. The FP value 21-60 and the mode information 21-61 are embedded as a part of the Fp cache processing engine call up command 21-22.

The contents data 21-23 contains the contents data in the case where the transfer mode is the normal transfer, or contains the difference data in the case where the transfer mode is the differential transfer, or empty in the case where the transfer mode is the compressed transfer.

The FP cache processing engine downloading command 21-21 and the FP cache processing engine call up command 21-22 are executed when the browser core engine unit 2-1 analyzes the reply data.

The FP value 21-60 contains the FP value calculated by the FP calculation unit 4-8. The mode information 21-61 contains information indicating a current transfer mode (the differential transfer, the compressed transfer, or the normal transfer).

More specifically, the body portion 21-2 has a configuration as shown in FIG. 22. In this configuration, the body portion 5-2 is in the HTML format, into which the FP cache processing engine downloading command 21-21, the FP cache processing engine call up command 21-22 and the contents data 21-23 are embedded.

The FP cache processing engine call up command 21-22 is a portion between <SCRIPT> tag and </SCRIPT> tag, similarly as the FP cache processing engine call up command 5-22 described above.

The contents data 21-23 is embedded between <COMMENT ID="MDATA"> tag and </COMMENT> tag. This ID="MDATA" is an identifier for referring to the contents data from the FP cache processing engine call up command 21-22.

The flow of the processing in the case where the FP cache processing engine call up command 21-22 is executed at the browser core engine unit 2-1 is as follows. First, the FP cache processing engine 2-2 is called up by a command 22-1, and the object name "mcsp" is allocated. Next, a command 22-2 is a command for setting the FP value to be a variable "fp". A command 22-3 is a command for setting the content or the contents data embedded between <COMMENT ID="MDATA"> tag and </COMMENT> tag described above to be a variable "contents".

In a command 22-4, "mcsp.regFP" is a command for executing a method called "regFP" on an object called "mcsp". The FP cache processing engine 2-2 has three methods in correspondence to the three transfer modes, and can carry out the processing corresponding to each transfer mode by executing "uncompress" in the case of the compressed transfer, or executing "makeData" in the case of the differential transfer, or executing "regFP" in the case of the normal transfer. The object "mcsp" generated by the command 22-1 also have these three methods.

The three methods will now be described. First, the "uncompress" method to be used in the case of the compressed transfer takes the FP value as its argument, extracts the contents data corresponding to the FP value from the FP cache region 3-3 and returns it as a return value.

The "makeData" method to be used in the ease of the differential transfer takes the FP value and the difference data (that contains the different base FP value, as shown in FIG. 15) as its arguments, composes the contents data by using the difference base FP value and the difference data, registers the FP value and the contents data into the FP cache region 3-3, and returns the contents data as a return value.

The "regFP" method to be used in the case of the normal transfer takes the FP value and the contents data as its arguments, registers the FP value and the contents data into the FP cache region 3-3, and returns the contents data as a return value.

The command 22-4 sets the contents data obtained as a processing result of the FP cache processing engine 2-2 to be a variable "output", and the value of this variable is outputted to the browser core engine unit 2-1 by a command 22-5.

The type of the method to be called up by the command 22-4 is selectively generated by the reply generation unit 4-9 according to the transfer mode determined by the analysis unit 4-2 or the FP management unit 4-7 of the proxy server 1-2. Consequently, the type of the method to be executed by the command 22-4 indicates the mode information 21-61. in this configuration, there is no need for the Web browser 1-1 side to distinguish the transfer mode.

By embedding the FP value 21-60 and the transfer mode information 21-61 into the FP cache processing engine call up command 21-22 in this way, and using a configuration in which the contents data 21-23 and the difference data contained therein can be directly referred from the FP cache processing engine call up command 21-22 in this way, there is an advantage that the processing for separating the FP value, the contents data and the difference data from the reply message at the Web browser 1-1 side becomes unnecessary.

As described, according to the present invention, it is possible to reduce the network load by using the fingerprint compression and the differential compression, by providing the proxy server at the server side and using the general purpose browser at the client side, without requiring a separate proxy server at the client side.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the FP cache processing engine of the above described embodiments can be conveniently implemented in a form of a software package.

Such a software package can be a computer program product which employs a storage medium including stored computer code which is used to program a computer to perform the disclosed function and process or the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides Those already mentioned above, many modifications and variations of the above embodiments may be made without departing from the novel and advantageous features of the present invention. Accordingly, all such modifications and variations are intended to be included within the scope of the appended claims.

What is claimed is:

1. A data transfer device for transferring a request received from a client to a server which is a destination of the request, and transferring contents data according to the request received from the server to the client that is a source of the request, comprising:

a reception unit configured to receive the request from the client and the contents data from the server;

a transmission unit configured to transmit the request to the server and the contents data to the client;

a feature quantity calculation unit configured to calculate a feature quantity indicating a feature of the contents data, upon receiving the contents data in response to the request;

a memory unit configured to store the feature quantity and the contents data in correspondence;

a search unit configured to search through the memory unit to check whether the feature quantity identical to a new feature quantity calculated by the feature quantity calculation unit is stored in the memory unit or not, and output a search result; and a control unit configured to control the search unit to carry out a search, determine information to be transmitted from the transmission unit according to the search result, and control the transmission unit to transmit to the client a reply message formed by a header portion and a body portion, which contains the feature quantity in the body portion, when the feature quantity identical to the new feature quantity is stored in the memory unit, or control the transmission unit to transmit to the client the reply message which contains the contents data and the new feature quantity in the body portion, while storing the new feature quantity and a corresponding contents data in the memory unit, when the feature quantity identical to the new feature quantity is not stored in the memory unit, wherein the control unit stores the contents data and the feature quantity in correspondence into the memory unit, and controls the search unit to carry out another search for a difference base data having a similarity with the contents data greater than or equal to a prescribed threshold, when the contents data having the feature quantity identical to the new feature quantity is not stored in the memory unit as a result of the search, and the control unit controls the transmission unit to transmit to the client a difference data indicating a difference between the contents data and the difference base data, the feature quantity of the contents data, and a difference base feature quantity which is the feature quantity of the difference base data, when the difference base data exists as a result of the another search, or controls the transmission unit to transmit to the client the contents data and the feature quantity of the contents data when the difference base data does not exist as a result of the another search.

2. The data transfer device of claim 1, wherein the feature quantity calculation unit calculates the feature quantity indicating the feature of the contents data, upon receiving the contents data in a prescribed format in response to the request.

3. The data transfer device of claim 1, wherein the feature quantity calculation unit calculates the feature quantity by using a prescribed hash function.

4. The data transfer device of claim 1, wherein the transmission unit also transmits a command for installing a cache processing program for carrying out a caching processing by utilizing the feature quantity, at a data receiving and displaying device of the client, and a command for activating the cache processing program.

5. The data transfer device of claim 1, wherein the transmission unit also transmits a notice indicating a location of a cache processing program for carrying out a caching processing by utilizing the feature quantity, which is to be installed at a data receiving and displaying device of the client, and a command for activating the cache processing program.

6. A data transfer method for transferring a request received from a client to a server which is a destination of the request, and transferring contents data according to the request received from the server to the client that is a source of the request, comprising:

calculating a feature quantity indicating a feature of the contents data, upon receiving the contents data in response to the request;

storing the feature quantity and the contents data in correspondence into a memory;

searching through the memory to check whether the feature quantity identical to a new feature quantity calculated by the calculating step is stored in the memory or not;

transmitting to the client a reply message formed by a header portion and a body portion, which contains the feature quantity in the body portion, when the feature quantity identical to the new feature quantity is stored in the memory;

transmitting to the client the reply message which contains the contents data and the new feature quantity in the body portion, while storing the new feature quantity and a corresponding contents data in the memory, when the feature quantity identical to the new feature quantity is not stored in the memory;

storing the contents data and the feature quantity in correspondence into the memory, and carrying out another search for a difference base data having a similarity with the contents data greater than or equal to a prescribed threshold, when the contents data having the feature quantity identical to the new feature quantity is not stored in the memory as a result of the search; and transmitting to the client a difference data indicating a difference between the contents data and the difference base data, the feature quantity of the contents data, and a difference base feature quantity which is the feature quantity of the difference base data, when the difference base data exists as a result of the another search, or transmitting to the client the contents data and the feature quantity of the contents data when the difference base data does not exist as a result of the another search.

7. The data transfer method of claim 6, wherein the calculating step calculates the feature quantity indicating the feature of the contents data, upon receiving the contents data in a prescribed format in response to the request.

8. The data transfer method of claim 6, wherein the calculating step calculates the feature quantity by using a prescribed hash function.

9. The data transfer method of claim 6, further comprising:

transmitting a command for installing a cache processing program for carrying out a caching processing by utilizing the feature quantity, at a data receiving and displaying device of the client, and a command for activating the cache processing program.

10. The data transfer device of claim 6, further comprising:

transmitting a notice indicating a location of a cache processing program for carrying out a caching processing by utilizing the feature quantity, which is to be installed at a data receiving and displaying device of the client, and a command for activating the cache processing program.

11. A data communication method for use in a network system including a data receiving and displaying device, a server and a data transfer device disposed corresponding to the server and connected with the data receiving and displaying device via a network, each of the data receiving and displaying device and the data transfer device having a memory unit, the method comprising:

transmitting a request from the data receiving and displaying device to the server via the data transfer device;

transmitting contents data according to the request from the server to the transfer device;

calculating a feature quantity indicating a feature of the contents data at the data transfer device that received the contents data;

searching through the memory unit to check whether the feature quantity identical to a new feature quantity calculated by the calculating step is stored in the memory unit or not at the data transfer device;

storing the new feature quantity and the contents data in correspondence into the memory unit and transmitting to the data receiving and displaying device a reply message formed by a header portion and a body portion, which contains the contents data and the feature quantity in the body portion, at the data transfer device when the feature quantity identical to the new feature quantity is not stored in the memory unit;

transmitting to the data receiving and displaying device the reply message which contains the feature quantity in the body portion when the feature quantity identical to the new feature quantity is stored in the memory unit;

receiving the reply message and checking whether the received reply message contains the contents data and the new feature quality in the body portion at the data receiving and displaying device;

displaying the received contents data and storing the received contents data and the feature quantity in correspondence into the memory unit at the data receiving and displaying device when the received reply message contains the contents data and the feature quantity;

searching through the memory unit to check whether the feature quantity identical to the received feature quantity included in the received reply message is stored in the memory unit or not at the data receiving and displaying device when the received reply message contains the feature quantity but no contents data;

displaying the contents data corresponding to the feature quantity stored in the memory unit and identical to the received feature quantity included in the received reply message, at the data receiving and displaying device when the feature quantity identical to the received feature quantity included in the received reply message is stored in the memory unit; and transmitting a re-request message for requesting the contents data from the data receiving and displaying device to the data transfer device when the feature quantity identical to the received feature quantity included in the received reply message is not stored in the memory unit.

* * * * *